US010108153B2

(12) United States Patent
Park et al.

(10) Patent No.: US 10,108,153 B2
(45) Date of Patent: Oct. 23, 2018

(54) INVERTER-BASED STAND-ALONE MICROGRID CONTROL SYSTEM USING TIME SYNCHRONIZATION-BASED MEASUREMENT UNIT

(71) Applicants: Industry-Academic Cooperation Foundation, Yonsei University, Seoul (KR); Korea ElectroTechnology Research Institute, Changwon-si, Gyeongsangnam-do (KR)

(72) Inventors: Jungwook Park, Seoul (KR); Soohyoung Lee, Gunpo-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 313 days.

(21) Appl. No.: 14/964,954

(22) Filed: Dec. 10, 2015

(65) Prior Publication Data

US 2016/0329709 A1 Nov. 10, 2016

(30) Foreign Application Priority Data

May 7, 2015 (KR) .......................... 10-2015-0063754
Oct. 5, 2015 (KR) .......................... 10-2015-0139819
Oct. 5, 2015 (KR) .......................... 10-2015-0140004

(51) Int. Cl.
*H02J 3/16* (2006.01)
*G05B 13/02* (2006.01)
*H02J 3/08* (2006.01)
*H02J 3/48* (2006.01)
*H02J 3/38* (2006.01)

(52) U.S. Cl.
CPC .............. *G05B 13/026* (2013.01); *H02J 3/08* (2013.01); *H02J 3/48* (2013.01); *H02J 2003/388* (2013.01); *Y02P 80/14* (2015.11); *Y02P 80/152* (2015.11)

(58) Field of Classification Search
CPC ....... G05B 13/026; Y02P 80/14; Y02P 80/152
See application file for complete search history.

(56) References Cited

U.S. PATENT DOCUMENTS

2012/0205981 A1\* 8/2012 Varma .................. H02J 3/01 307/64
2014/0343878 A1\* 11/2014 Gudmundsson ... G01R 19/2513 702/64

\* cited by examiner

*Primary Examiner* — Seahvosh Nikmanesh
(74) *Attorney, Agent, or Firm* — Paratus Law Group, PLLC

(57) ABSTRACT

An inverter-based stand-alone microgrid control system using a time synchronization-based measurement unit, in which a converter controller configured to control a converter that determines a voltage and a phase of a point where a plurality of distributed power supply devices is interconnected. The system includes a time correction unit configured to provide a time corrected on the basis of time information received from a GPS; a signal comparison/generation unit configured to compare a sine wave generated according to a voltage magnitude and a phase reference signal with a harmonic carrier signal on the basis of the time provided by the time correction unit, and generate a PWM signal; and a switch operation control unit configured to apply the PWM signal from the signal comparison/generation unit to the converter, and operate a switch.

20 Claims, 16 Drawing Sheets

INVERTER-BASED STAND-ALONE MICROGRID CONTROL SYSTEM USING TIME SYNCHRONIZATION-BASED MEASUREMENT UNIT

CROSS REFERENCE TO PRIOR APPLICATION

This application claims the priority of Korean Patent Application Nos. 2015-0063754 filed on May 7, 2015, 2015-0139819 filed on Oct. 5, 2015 and 2015-0140004 filed on Oct. 5, 2015 in the Korean Intellectual Property Office, the disclosure of which is incorporated herein by reference.

BACKGROUND OF THE INVENTION

Field of the Invention

The present invention relates to a stand-alone microgrid, and more particularly, to an inverter-based stand-alone microgrid control system using a PMU that enables each converter-based power supply to be accurately operated by conducting a grid analysis based on synchronization data acquired by the PMU and thus providing an accurate operation point.

Description of the Related Art

Recently, along with emergence of a smart grid, a microgrid power grid independent of an existing power grid has been widely employed in island areas or remote areas in Korea and abroad by using a distributed power supply such as wind power, solar energy, and the like, and an energy storage system. However, it is frequently in need of maintenance and repair due to its breakdowns and low reliability.

Microgrid power grids can be classified by a connection method and a control method.

The microgrid power grids can be classified by a connection method into an AC microgrid in which components are interconnected in an AC manner and a DC microgrid in which components are interconnected in a DC manner.

The AC microgrid uses a conventional distribution network but causes problems with synchronization, stability, and reactive power.

Meanwhile, the DC microgrid does not have any problems with synchronization, stability, and reactive power and does not need a two-step power conversion process when connecting power generated from each power supply, resulting in a low system loss and a low cost.

Particularly, most of digital loads sharply increased in use in recent years need DC power, and, thus, the DC microgrid is more efficient. Therefore, the DC microgrid has been at the center of a lot of attention recently.

The microgrid power grids can also be classified by a control method. Firstly, there is a method in which a central controller is provided and a system is operated by measuring energy of components in real time. According to this method, a sensor for measuring energy and a communication network for transmitting measured data to the central controller are needed.

This method has an advantage in that the central controller rapidly receives information of each of components using a high-speed communication network and controls them, and, thus, it is possible to readily operate a power grid, but also has a disadvantage in that it needs a climate prediction algorithm for air volume or amount of insulation in the case of using a distributed power supply such as wind power and solar energy and has a high level of dependence on communication.

Further, this method uses an operation algorithm depending on power transaction and focuses on the maintenance of power balance of a high-level grid. Thus, this method is suitable for a grid-interconnected microgrid.

As another control method, there is an autonomous control method in which converters respectively connected with components (distributed power supply, energy storage system, and the like) of a microgrid power grid autonomously control the components connected thereto.

According to this method, the respective components are configured to autonomously and somewhat independently control their own operations and readily operate a microgrid power grid overall.

According to this method, an expensive communication system is not required and a demand-side can be autonomously managed with a simple operation algorithm. However, since a state transmission cannot be made between devices, the energy storage system is overburdened, which may cause a sharp reduction in life span and may also cause a circulating current between the components, and makes it difficult to efficiently operate a distributed power supply.

However, this autonomous control method does not require a high-speed communication network and does not need to use a climate prediction algorithm and a complicated control algorithm. Thus, it is suitable for a stand-alone microgrid power grid which is operated separately from a grid.

Since the stand-alone microgrid is independently operated as being isolated from an existing power grid, the maintenance of power balance during an operation is the most important factor and determines reliability.

As such, if the autonomous control method is applied to the stand-alone microgrid, a high-speed communication network, a climate prediction algorithm, and a complicated central control algorithm are not needed. However, a circulating current may occur and a life span may be decreased due to excessive use of the energy storage system.

Therefore, if a stand-alone DC microgrid power grid is controlled based on the autonomous control method, a control method for improving reliability depending on power balance in a microgrid power grid, suppressing occurrence of a circulating current between power components, and improving a life span of an energy storage system is demanded.

If a plurality of converter-based distributed power supply devices is connected to a stand-alone microgrid, a power flow is determined depending on a relative voltage and a phase of each converter.

The power flow determines an output of each converter. Therefore, it is very important to determine a voltage and a phase at a point where each converter is connected. A conventional P-Q control method of directly controlling an output of each converter makes a grid unstable, and, thus, cannot be employed.

SUMMARY OF THE INVENTION

The present invention is conceived to solve the problems of the conventional microgrid system. An aspect of the present invention provides an inverter-based stand-alone microgrid control system using a PMU that enables each switch to be operated on the basis of a clear sinusoidal signal by maintaining the same voltage, the same frequency, and the same phase in all of converters through GPS time synchronization.

An aspect of the present invention also provides an inverter-based stand-alone microgrid control system using a PMU that provides a microgrid interconnection technology and a converter controller configured to operate each switch on the basis of a clear sinusoidal signal through GPS time synchronization.

An aspect of the present invention also provides an inverter-based stand-alone microgrid control system using a PMU that enables each converter-based power supply to be accurately operated by conducting a grid analysis based on synchronization data acquired by the PMU and thus providing an accurate operation point.

An aspect of the present invention also provides an inverter-based stand-alone microgrid control system using a PMU that requires a very few calculation resources for a grid analysis by using characteristics of maintaining the grid even when an inverter controller using time synchronization provides an operation point several seconds late, and has a strong grid operational capability even in an unstable communication environment such as a signal delay or disconnection from a central control center.

An aspect of the present invention also provides an inverter-based stand-alone microgrid control system using a PMU that effectively controls an operation of each microgrid and power management (transaction) between microgrids by using a multi-microgrid technology including PMU-based acquisition of phase synchronization data and control of a phase synchronization converter based on GPS time synchronization.

An aspect of the present invention also provides an inverter-based stand-alone microgrid control system using a PMU that enables accurate power transmission between multi-microgrids and accurate synchronization at the time of disconnection/connection between microgrids with a high-level control center using a multi-microgrid technology including PMU-based acquisition of phase synchronization data and control of a phase synchronization converter based on GPS time synchronization.

The aspects of the present invention are not limited to the above-described aspects, and other aspects, which are not mentioned herein, can be clearly understood by those skilled in the art from the following description.

According to an aspect of the present invention, there is provided an inverter-based stand-alone microgrid control system using a PMU, in which a converter controller configured to control a converter that determines a voltage and a phase of a point where a plurality of distributed power supply devices is interconnected includes: a time correction unit configured to provide a time corrected on the basis of time information received from a GPS; a signal comparison/generation unit configured to compare a sine wave generated according to a voltage magnitude and a phase reference signal with a harmonic carrier signal on the basis of the time provided by the time correction unit, and generate a PWM signal; and a switch operation control unit configured to apply the PWM signal from the signal comparison/generation unit to the converter, and operate a switch.

Herein, the time correction unit includes a GPS receiving unit configured to receive time information once per second from the GPS and an internal clock, as a converter internal clock, configured to correct the time information once per second on the basis of a GPS signal and provide a time of 1 second divided into microseconds.

Further, the signal comparison/generation unit includes a function generation unit configured to generate a sinusoidal signal on the basis of the time provided by the time correction unit, and generate a sine wave according to a voltage magnitude and a phase reference signal, a harmonic carrier signal generation unit configured to generate a harmonic carrier signal in the range of 10 kHz to 20 kHz to be used by the converter, and a PWM signal generation unit configured to compare the sine wave from the function generation unit with the carrier signal from the harmonic carrier signal generation unit, and generate a PWM signal.

According to another aspect of the present invention, there is provided an inverter-based stand-alone microgrid control system using a PMU, including: a stand-alone microgrid including converters that determine a voltage and a phase of a point where a plurality of distributed power supply devices is interconnected; a converter controller configured to correspond to each of the converters in order to control the converters included in the stand-alone microgrid and also configured to control a switch operation of each of the converters on the basis of a noiseless sinusoidal signal; and a microgrid control center including a microgrid EMS (Microgrid Energy Management System) configured to provide initial operation reference values, and configured to perform power-generation prediction and economic load dispatch for managing the microgrid and perform SCADA (Supervisory Control and Data Acquisition) for automatically supervising and controlling an operation state of a low-level system.

Herein, data acquired by a time synchronization-based measurement unit (PMU) installed in the microgrid are periodically transmitted to the microgrid control center, and a high-level multi-microgrid control tower issues a command for multi-microgrid interconnection.

Further, the microgrid EMS determines an output of a converter-based generator (CBG) and an input/output amount of an energy storage system (ESS) within the microgrid on the basis of current load, power-generation quantity, and SOC and predicted load and power-generation quantity pattern and provides the initial operation reference values.

Further, the microgrid control center includes a supervisory power control block configured to compare current CBG and ESS operation values transmitted from the measurement unit with the initial operation reference values and provide modified operation reference values.

Further, the supervisory power control block continuously operates and reduces an error until the microgrid EMS provides new initial operation reference values, and transmits modified operation reference values to a power flow calculation block and a system model modification block in each operation.

Further, the microgrid control center includes a system model modification block configured to compare actual system measurement values obtained when modified operation reference values are transmitted and modify and complement a system model when an error is greater than a reference value.

Further, the system model modification block repeatedly compares a result of a power flow calculation using the modified operation reference values with the actual system measurement values and reflects a microgrid impedance (Zmg) to a model for a power flow calculation block.

Further, the microgrid control center includes a power flow calculation block configured to perform a power flow calculation by reflecting operation reference values modified by a supervisory power control block to a model to which currently measured loads are applied, and obtain a phase angle of a CBG to satisfy a given condition.

Further, the power flow calculation block performs a power flow calculation by reflecting operation reference values issued from a high-level multi-microgrid control tower in the case of a multi-microgrid including a number of interconnected microgrids, and a corresponding value is used for power transmission between multi-microgrids.

Further, the microgrid control center includes a tie line control means configured to control power transmission and interconnection between multi-microgrids, and in a situation where multi-microgrids are continuously interconnected, the tie line control means intactly uses operation reference values transmitted after a power flow calculation and in a situation where separated multi-microgrids are being interconnected, the tie line control means synchronizes voltage magnitudes and phases of both interconnection buses by reflecting modified portions of the operation reference values transmitted from a high-level multi-microgrid control tower.

According to yet another aspect of the present invention, there is provided an inverter-based stand-alone microgrid control system using a PMU, including: stand-alone microgrids each including converters that determine a voltage and a phase of a point where a plurality of distributed power supply devices is interconnected; a converter controller configured to correspond to each of the converters in order to control the converters included in the stand-alone microgrid and also configured to control a switch operation of each of the converters; a microgrid control center configured to perform power-generation prediction and economic load dispatch for managing the microgrid and perform SCADA (Supervisory Control and Data Acquisition) for automatically supervising and controlling an operation state of a low-level system; and a multi-microgrid control tower configured to control microgrid control centers respectively connected to microgrids, synchronize both buses when interconnecting separated microgrids, and issue a command to a microgrid control center of each microgrid so as to have a phase and a voltage for power transmission between multi-microgrids after interconnection.

Further, data acquired by a time synchronization-based measurement unit (PMU) installed in the microgrid are periodically transmitted to the microgrid control center, the microgrid control center periodically transmits data for multi-microgrid control among the transmitted data to the high-level multi-microgrid control tower, and the multi-microgrid control tower issues a command for multi-microgrid interconnection to the microgrid control center.

Further, a PMU installed in a multi-microgrid bus measures a voltage magnitude, a phase angle, active power, and reactive power in the bus and transmits the measured values to the microgrid control center, and the microgrid control center transmits values of an interconnection bus to the multi-microgrid control tower.

Further, the multi-microgrid control tower corrects reference points of voltage magnitudes and phase angles of unit circuits each including an interconnection bus and an interconnection line during synchronization for interconnection between microgrids, and the provided correction values are transmitted to the microgrid control center to correct a voltage magnitude and a phase angle of each CBG.

Further, the correction to the CBG is extended to the entire microgrid, and a voltage magnitude and a phase angle of the interconnection bus are also corrected, so that the single microgrid operates as a single converter on the basis of the interconnection bus.

Further, when the multi-microgrid is interconnected, the multi-microgrid control tower controls power transmission and transaction between interconnected microgrids and transmits active power on the basis of an analysis of a power flow in an interconnection line, and a supply amount of reactive power needed due to the transmission of the active power is adjusted and distributed by controlling phases of interconnection buses at both ends through a calculation of the power flow in the interconnection line.

Further, the converter controller controls all the converters included in the stand-alone microgrid to maintain the same voltage, the same frequency, and the same phase through GPS time synchronization.

The above-described inverter-based stand-alone microgrid control system using a PMU according to the present invention has the following effects.

Firstly, it enables each switch to be operated on the basis of a clear sinusoidal signal by maintaining the same voltage, the same frequency, and the same phase in all of converters through GPS time synchronization.

Secondly, it provides a microgrid interconnection technology and a converter controller configured to operate each switch on the basis of a clear sinusoidal signal through GPS time synchronization, and, thus, it is possible to efficiently control an operation of a stand-alone microgrid system.

Thirdly, it enables each converter-based power supply to be accurately operated by conducting a grid analysis based on synchronization data acquired by the PMU and thus providing an accurate operation point.

Fourthly, it requires a very few calculation resources for a grid analysis by using characteristics of an inverter controller using time synchronization and has a strong grid operational capability even in an unstable communication environment such as a signal delay or disconnection from a central control center.

Fifthly, it makes it possible to effectively control an operation of each microgrid and power management (transaction) between microgrids by using a multi-microgrid technology including PMU-based acquisition of phase synchronization data and control of a phase synchronization converter based on GPS time synchronization.

Sixthly, it enables accurate power transmission between multi-microgrids and accurate synchronization at the time of disconnection/connection between microgrids with a high-level control center using a multi-microgrid technology including PMU-based acquisition of phase synchronization data and control of a phase synchronization converter based on GPS time synchronization.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of an inverter-based stand-alone microgrid control system using a PMU according to the present invention will be described in detail.

Features and advantages of the inverter-based stand-alone microgrid control system using a PMU according to the present invention will become apparent from the detailed descriptions of the respective exemplary embodiments.

Figure 12A:
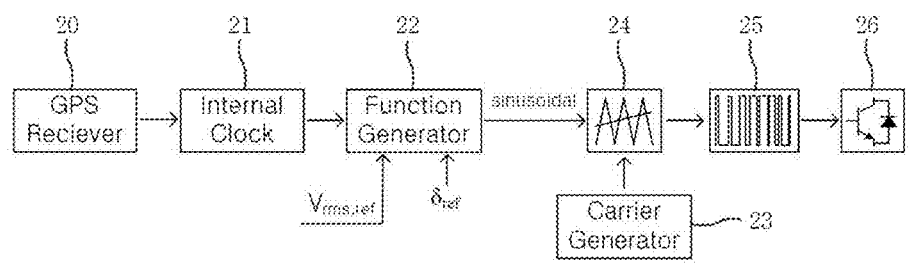
FIG. 12A is a configuration view of a converter controller of an inverter-based stand-alone microgrid control system using time synchronization according to the present invention.
Figure 12B:
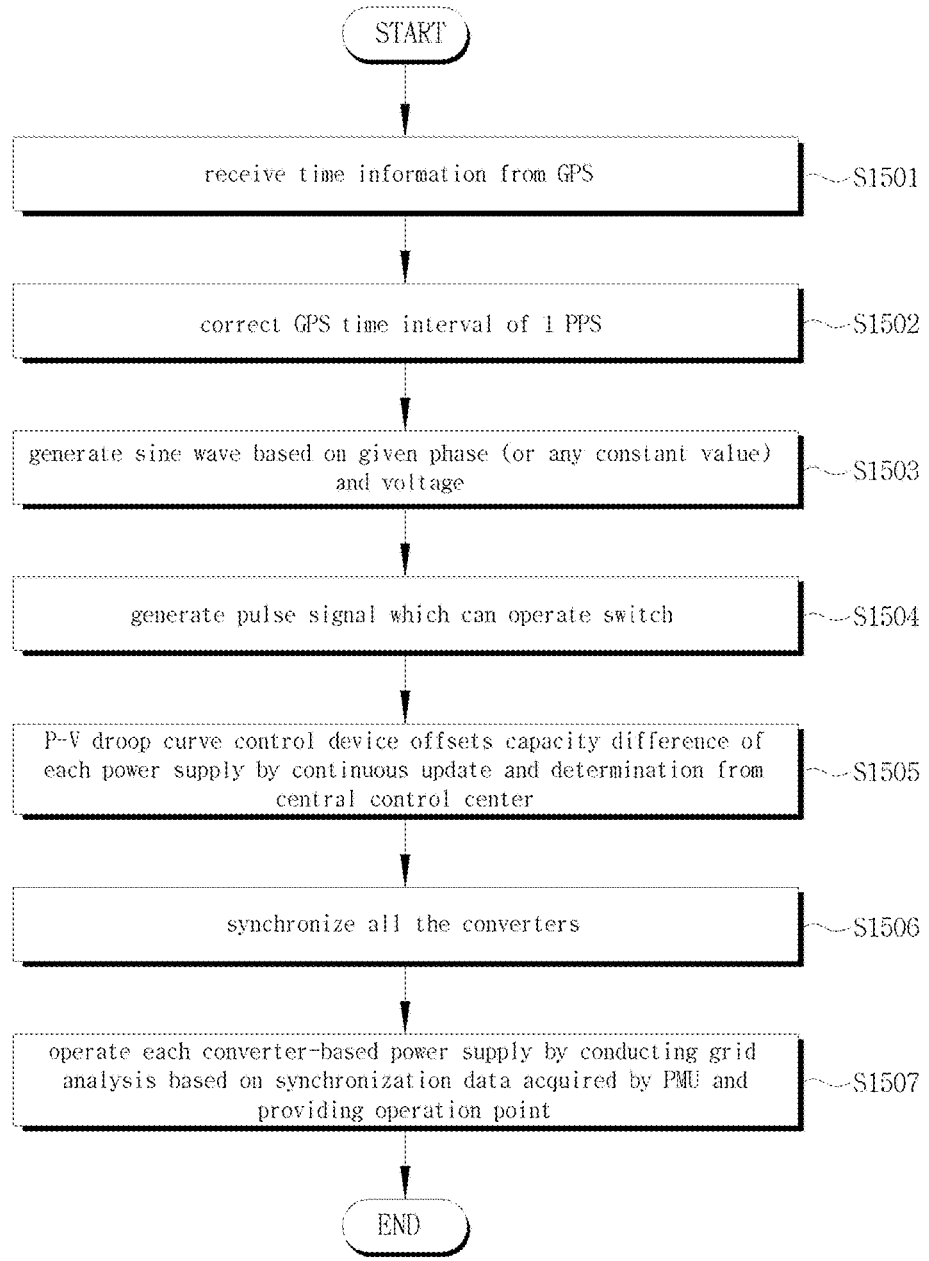
FIG. 12B is a flowchart for controlling an inverter-based stand-alone microgrid control system using time synchronization according to the present invention.

FIG. 12A is a configuration view of a converter controller of an inverter-based stand-alone microgrid control system using time synchronization according to the present invention, and FIG. 12B is a flowchart for controlling an inverter-based stand-alone microgrid control system using time synchronization according to the present invention.

The present invention provides a microgrid interconnection technology and a converter controller that enables each switch to be operated on the basis of a clear sinusoidal signal by maintaining the same voltage, the same frequency, and the same phase in all of converters through GPS (Global Positioning System) time synchronization.

The present invention enables each converter-based power supply to be accurately operated by conducting a grid analysis based on synchronization data acquired by a PMU (Phase Measurement Unit) and thus providing an accurate operation point, and requires a very few calculation resources for a grid analysis and has a strong grid operational capability even in an unstable communication environment such as a signal delay or disconnection from a central control center.

The present invention effectively controls an operation of each microgrid and power management (transaction) between microgrids by using a multi-microgrid technology including PMU-based acquisition of phase synchronization data and control of a phase synchronization converter based on GPS time synchronization.

Hereinafter, grid-interconnected and stand-alone microgrids and characteristics of a converter control will be described.

Figure 1A:
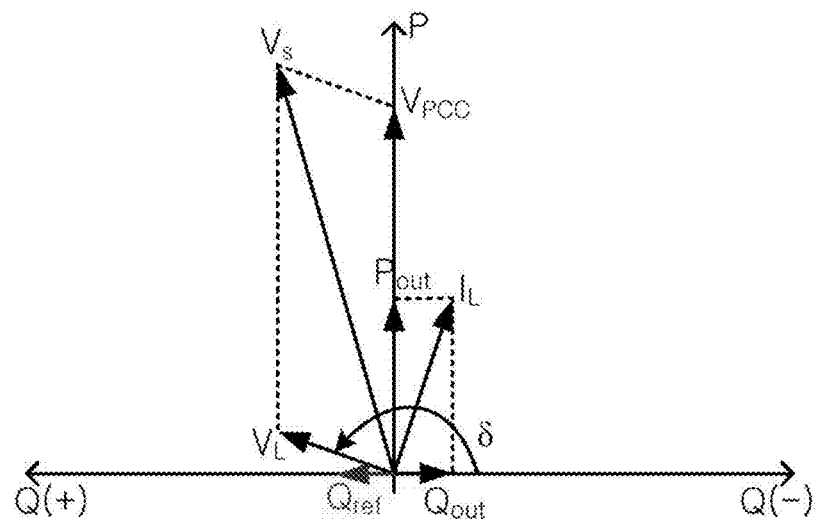
FIG. 1A and FIG. 1B are configuration views illustrating an initial state of a converter control and a state after a change of the control, respectively.
Figure 1B:
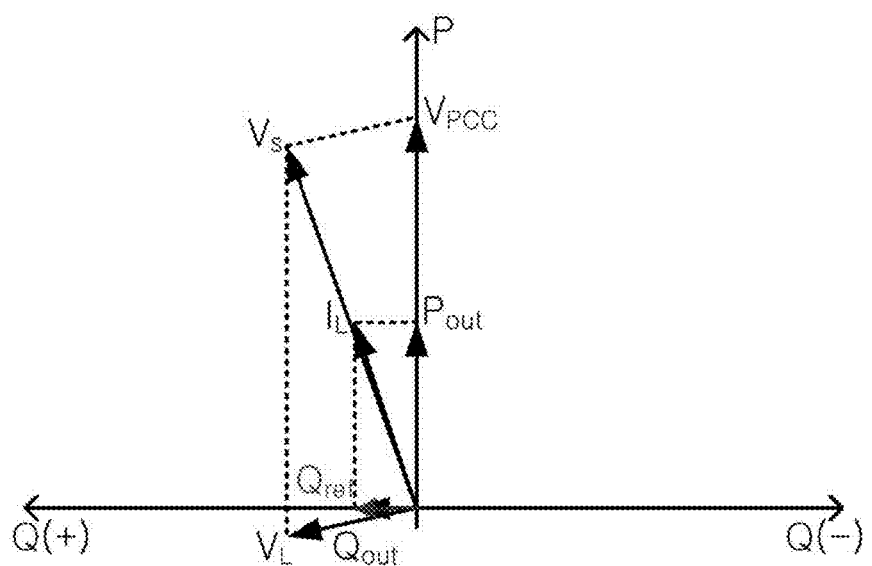

FIG. 1A and FIG. 1B are configuration views illustrating an initial state of a converter control and a state after a change of the control, respectively.

Figure 2A:
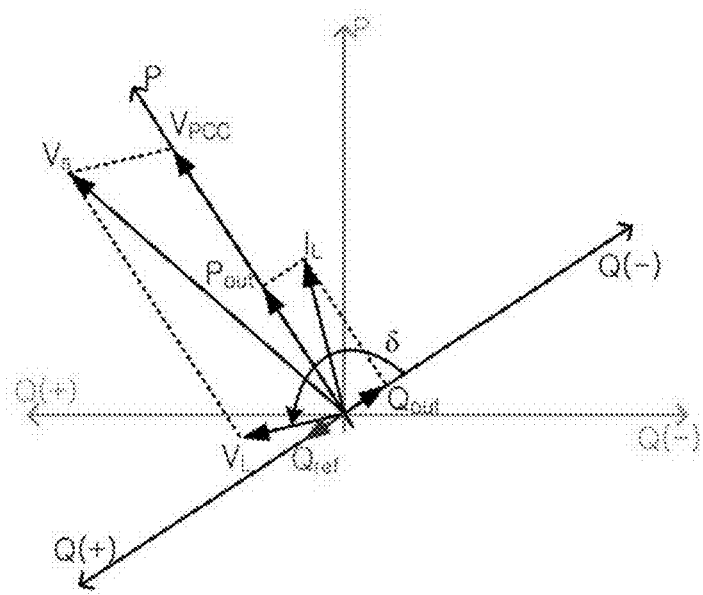
FIG. 2A and FIG. 2B are configuration views illustrating states of a stand-alone microgrid converter.
Figure 2B:
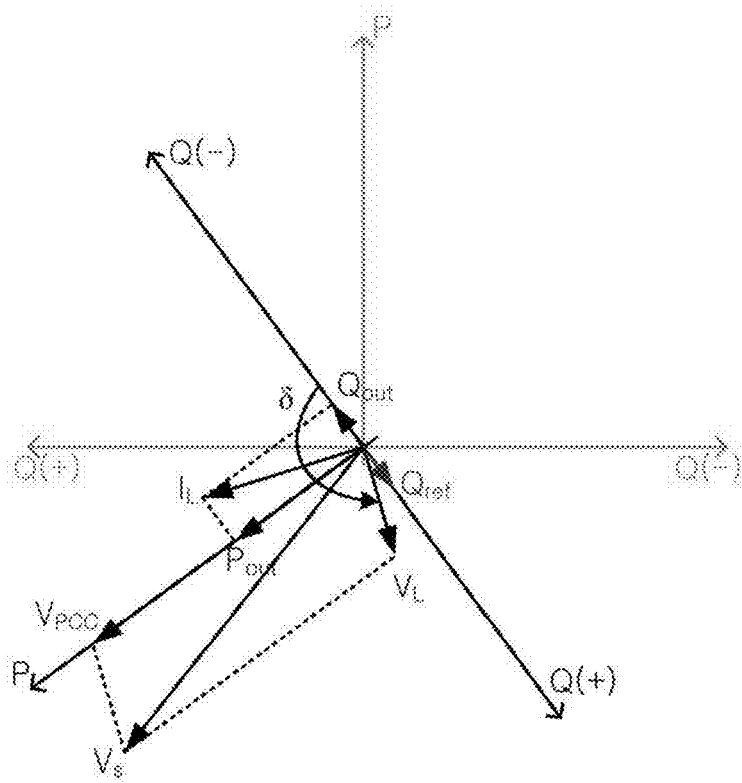
Figure 3:
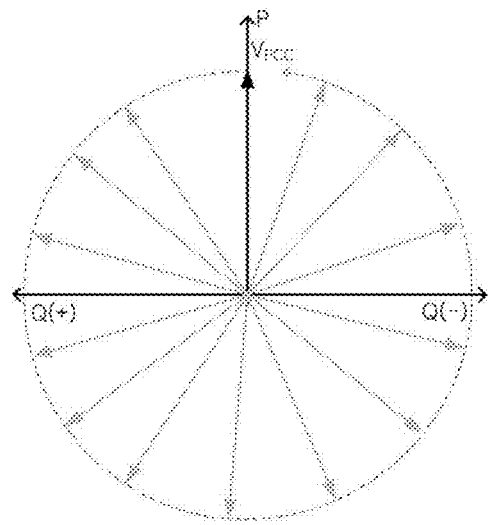
FIG. 3 is a configuration view illustrating a ceaseless phase change in a voltage at a common coupling point.

Further, FIG. 2A and FIG. 2B are configuration views illustrating states of a stand-alone microgrid converter, and FIG. 3 is a configuration view illustrating a ceaseless phase change in a voltage at a common coupling point.

Typically, a grid-interconnected microgrid can freely use a converter within the microgrid since an existing high-level grid provides strong operating references.

Meanwhile, a stand-alone microgrid requires a highly sophisticated technology for operating converters since it needs to provide operating references by itself. This problem also occurs when a large proportion of power consumption in a grid-interconnected microgrid is attributable to a converter.

An existing converter is designed assuming that a grid is very strong, and operates by the principles as illustrated in FIG. 1A and FIG. 1B.

Assuming that a state before a converter is controlled is as illustrated in FIG. 1A, the converter is in an operation state while consuming reactive power.

In this case, if a reactive power control reference is changed to Qref in order to supply reactive power, the converter converges on a state as illustrated in FIG. 1B.

Since the existing converter is designed assuming that a grid is very strong, a voltage $V_{PCC}$ at a common coupling point is uniformly maintained regardless of a state of the converter. That is, if a DQ transform is applied on the basis of 60 Hz as a grid reference frequency, a $V_{PCC}$ vector is fixed to a vertical axis in FIG. 1B. Since the voltage at the common coupling point is constant, outputs $P_{out}$ and $Q_{out}$ of active and reactive power of the converter are determined by a current $I_L$. Since an impedance of a filter is fixed, the $I_L$ is determined by a voltage $V_L$ applied to both ends of the filter.

Therefore, if the $V_L$ is controlled to be as illustrated in FIG. 1B, the reactive power output $Q_{out}$ follows a value indicated by a reference signal value $Q_{ref}$.

Further, if the converter becomes of great importance, a dominant power supply within the microgrid is transferred to the converter from a high-level grid, and the $V_{PCC}$ is determined as being greatly affected by an operation of the converter rather than the high-level grid.

Particularly, a stand-alone microgrid is separated from a high-level grid. Therefore, $V_{PCC}$ is determined only by operations of converters.

Assuming that a stand-alone microgrid includes a single converter, $V_{PCC}$ of the single converter is determined only by an operation of the converter.

That is, if a reactive power reference signal is changed with respect to a converter in a state as illustrated in FIG. 1A, the converter is placed on a state as illustrated in FIG. 2A in a very short time.

In FIG. 2A, $V_L$ has the same magnitude and same phase as illustrated in FIG. 1B.

However, since the stand-alone microgrid is not affected by the high-level grid, $V_{PCC}$ is not fixed and stand-alone microgrid is moved according to the operation of the converter.

That is, the state as illustrated in FIG. 1A before a reactive power control reference is modified turns into a stable state in which phases of all the values are uniformly shifted.

However, there is a difference between a desired value of the reactive power and a current value of the reactive value. Therefore, in order to control this difference, a phase of $V_L$ is shifted again as illustrated in FIG. 2B.

Likewise as in FIG. 2A, in FIG. 2B, a state is stabilized since phases of all of the components in FIG. 1A are equally shifted, and the reactive power still does not satisfy the control reference.

That is, in order to control the insufficient reactive power, $V_L$ is shifted continuously and $V_{PCC}$ is also shifted ceaselessly as illustrated in FIG. 3.

A reference axis in FIG. 1A is synchronously converted on the basis of 60 Hz as the grid reference frequency. Generally, the converter performs a synchronous conversion on the basis of a frequency at the common coupling point.

That is, if a phase of $V_{PCC}$ is continuously increased as illustrated in FIG. 2A and FIG. 2B, a frequency also increases and a frequency for synchronous conversion at the common coupling point increases accordingly.

The increase as illustrated in FIG. 2A and FIG. 2B continuously occurs when a frequency for synchronous conversion increases or decreases. Therefore, a frequency of the stand-alone microgrid is continuously changed similarly to the phase.

In an actual grid, a reactive power control reference cannot be exactly the same as an actual reactive power output. Therefore, in a grid-interconnected microgrid including a stand-alone microgrid or a large-scale converter, it is impossible to operate the microgrid by a conventional P-Q control method.

Figure 4A:
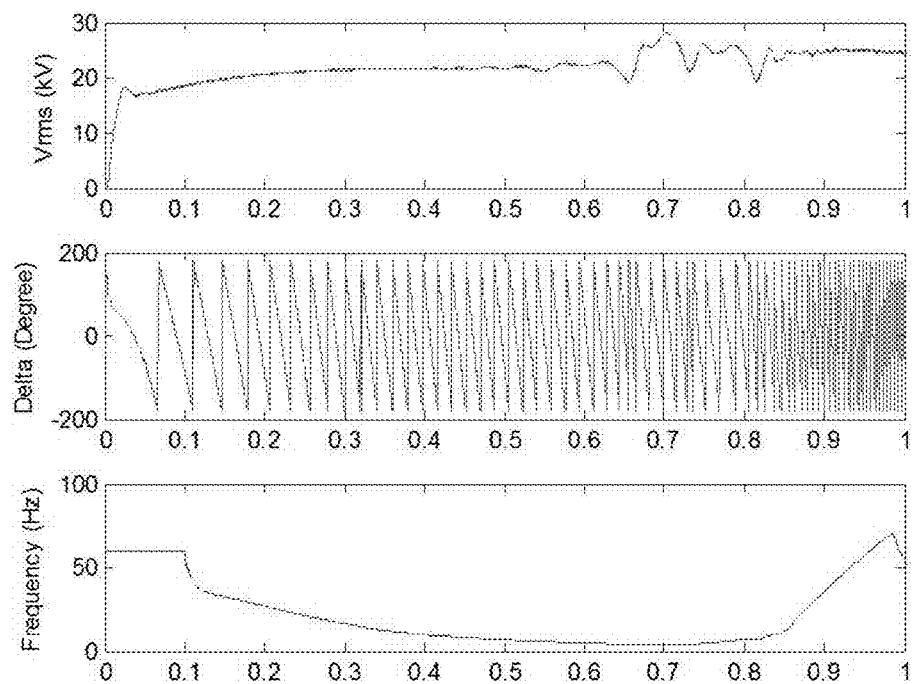
FIG. 4A and FIG. 4B are graphs illustrating operation results of a microgrid using only a P-Q control type converter and operation results of a P-Q control type converter and an accurate matching load, respectively.
Figure 4B:
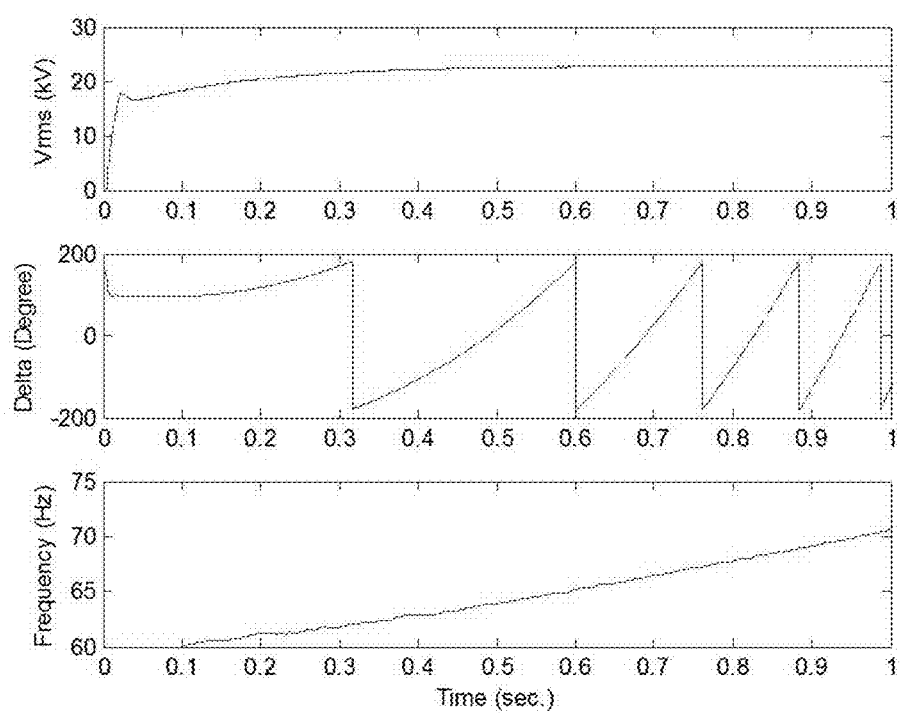

FIG. 4A and FIG. 4B are graphs illustrating operation results of a microgrid using only a P-Q control type converter and operation results of a P-Q control type converter and an accurate matching load, respectively.

According to a result of a PSCAD/EMTDC simulation of the case where a P-Q control is performed to all of converters within a microgrid, a phase and a frequency were continuously changed as illustrated in FIG. 4A.

Further, another simulation is performed after a converter model is directly connected to a passive load and an output reference signal and a magnitude of a load are exactly matched, a result as illustrated in FIG. 4B was obtained. Although the exact matching, which cannot be implemented in an actual environment, is provided, a phase and a frequency of the system were sharply changed.

Figure 5A:
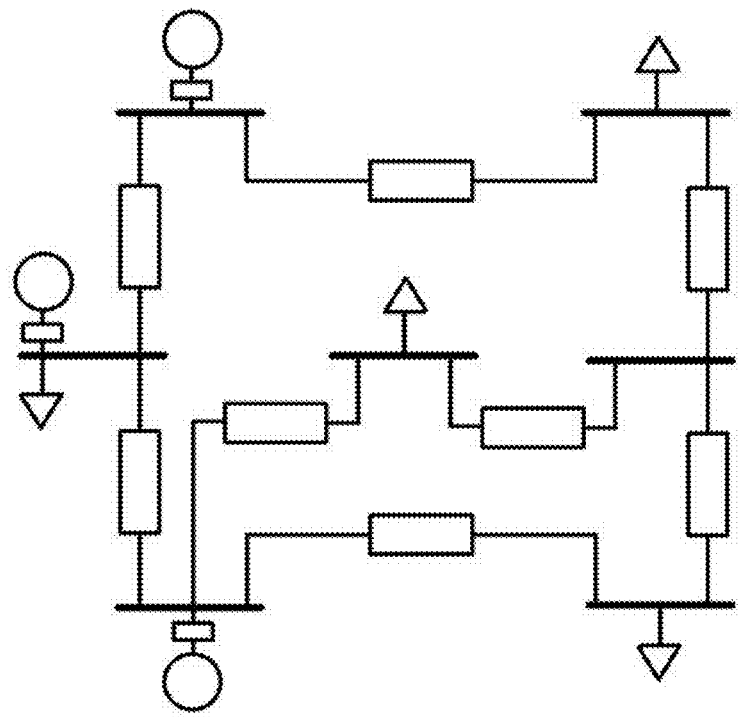
FIG. 5A and FIG. 5B are contracted configuration views of three microgrids and three microgrid systems, respectively.
Figure 5B:
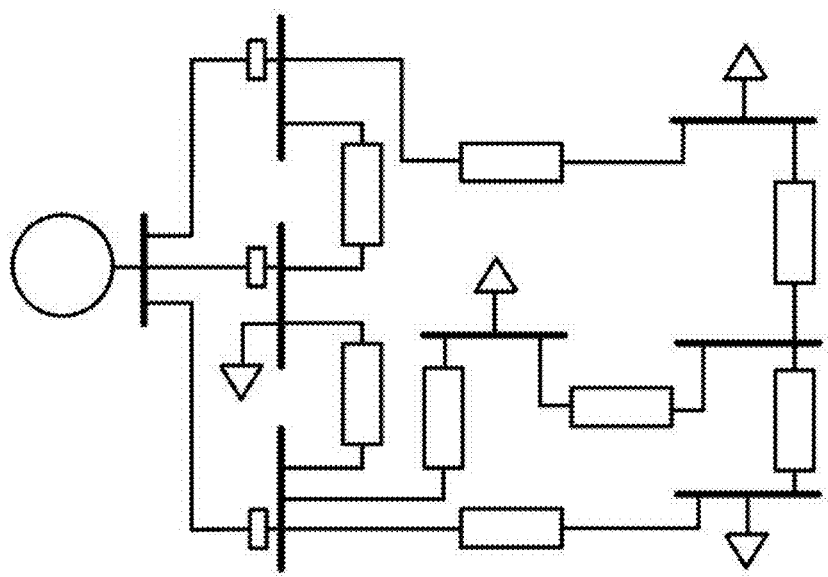

FIG. 5A and FIG. 5B are contracted configuration views of three microgrids and three microgrid systems, respectively.

Referring to FIG. 5A, if a plurality of converter-based distributed power supply devices are connected to a simple stand-alone microgrid, a power flow is determined depending on a relative voltage and a phase of each converter.

The power flow determines an output of each converter. Therefore, it is very important to determine a voltage and a phase at a point where each converter is connected.

A conventional P-Q control method of directly controlling an output of each converter makes a grid unstable, and, thus, cannot be employed. Therefore, a microgrid needs to be operated on the basis of a voltage and a phase which can be determined by the following process without a power flow calculation or a wide-area measurement.

Assuming that three converters in FIG. 5A have the same basic frequency voltage component before passing through a filter, a corresponding microgrid may be changed as illustrated in FIG. 5B.

In FIG. 5B, there is a single microgrid, and a voltage and a phase of a sole power supply determine voltages and phases of other parts.

All powers flow from a power supply toward a load. Even if a power flow is changed within the microgrid, the powers never return to the power supply through a specific line.

This is the same in a normal state even if any event such as a change in load or an opening a line occurs.

Therefore, the powers from specific power supplies in the three microgrids as illustrated in FIG. 5A never return to other power supplies. This means that the whole load is appropriately shared by the power supplies.

Figure 6:
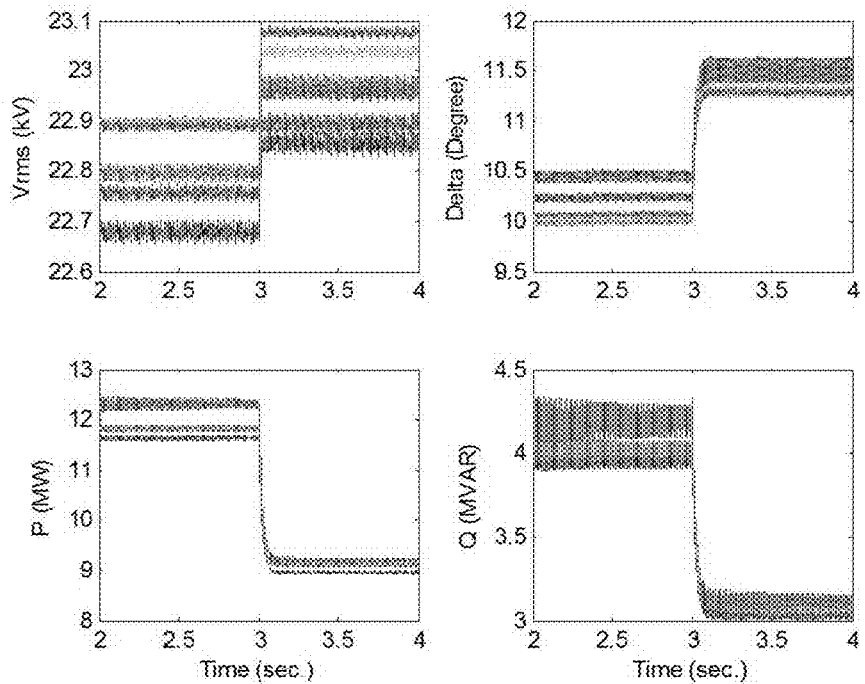
FIG. 6 is a graph illustrating a bus voltage, a phase, and active power and reactive power (25%) of a distributed power supply in three microgrids.
Figure 7:
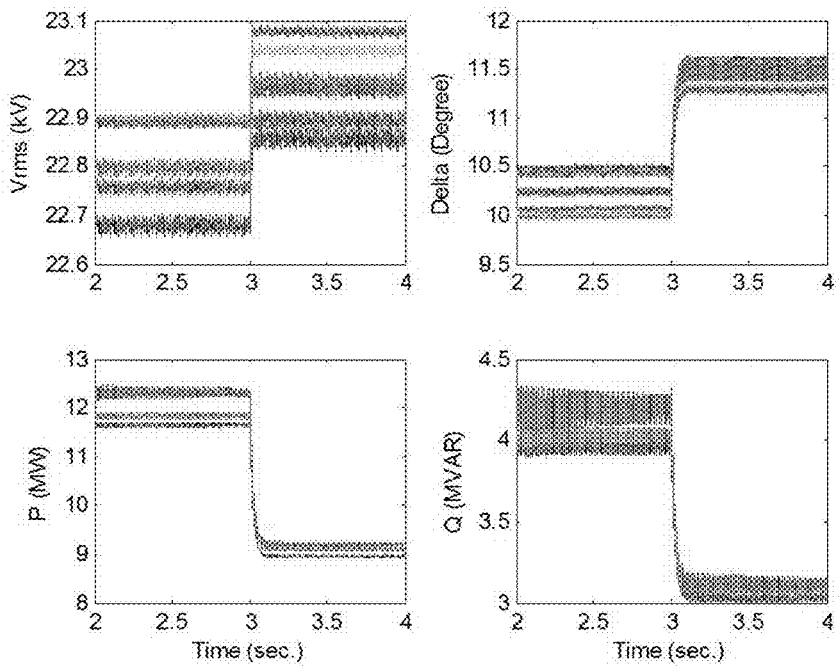
FIG. 7 is a graph illustrating a bus voltage, a phase, and active power and reactive power (25%) of three supply lines in a microgrid.

FIG. 6 and FIG. 7 illustrate changes in a power flow, a phase, and a voltage in distributed power supplies within three microgrids and three lines within a microgrid, respectively, in the case of 25% load shedding.

Figure 8:
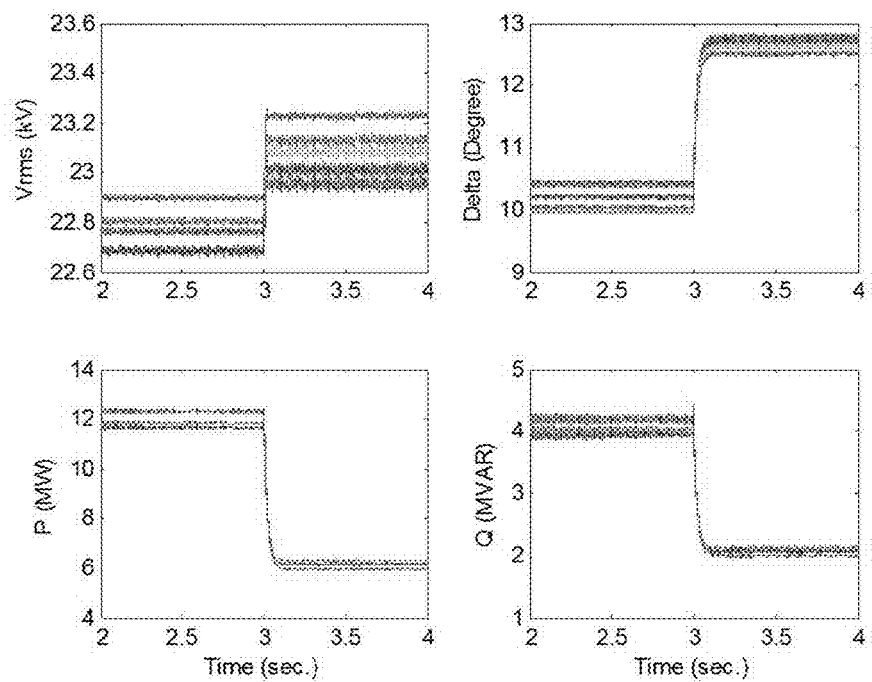
FIG. 8 is a graph illustrating a bus voltage, a phase, and active power and reactive power (50%) of a distributed power supply in three microgrids.
Figure 9:
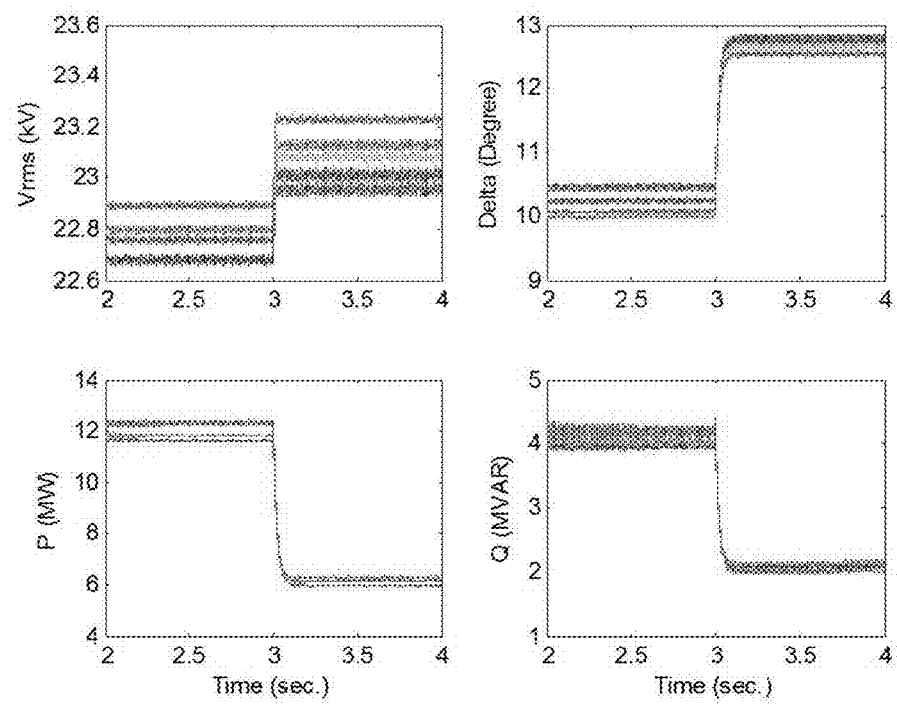
FIG. 9 is a graph illustrating a bus voltage, a phase, and active power and reactive power (50%) of three supply lines in a microgrid.

FIG. 8 and FIG. 9 illustrate changes in a power flow, a phase, and a voltage in distributed power supplies within three microgrids and three lines within a microgrid, respectively, in the case of 50% load shedding.

Figure 10:
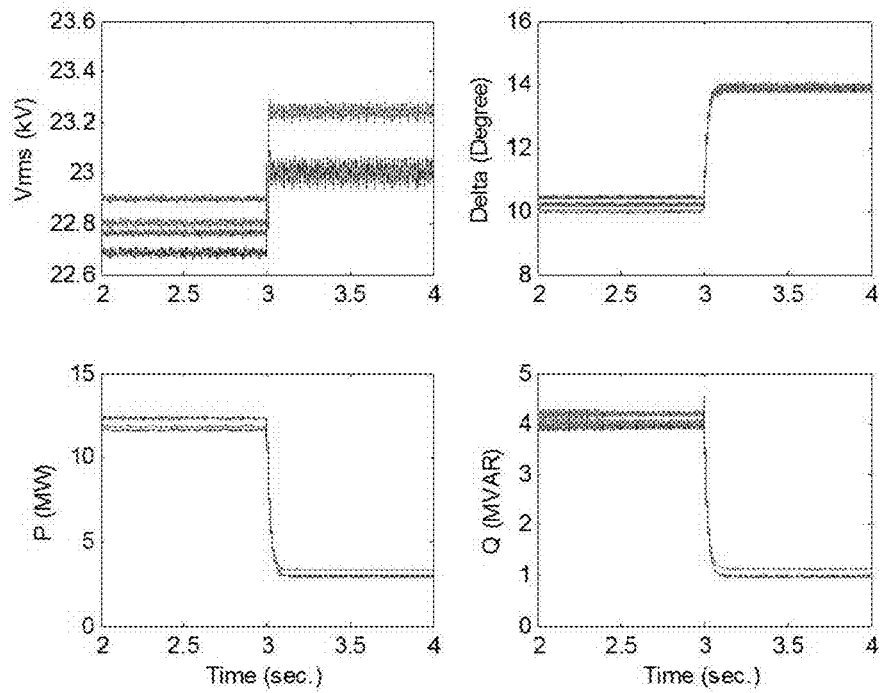
FIG. 10 is a graph illustrating a bus voltage, a phase, and active power and reactive power (75%) of a distributed power supply in three microgrids.
Figure 11:
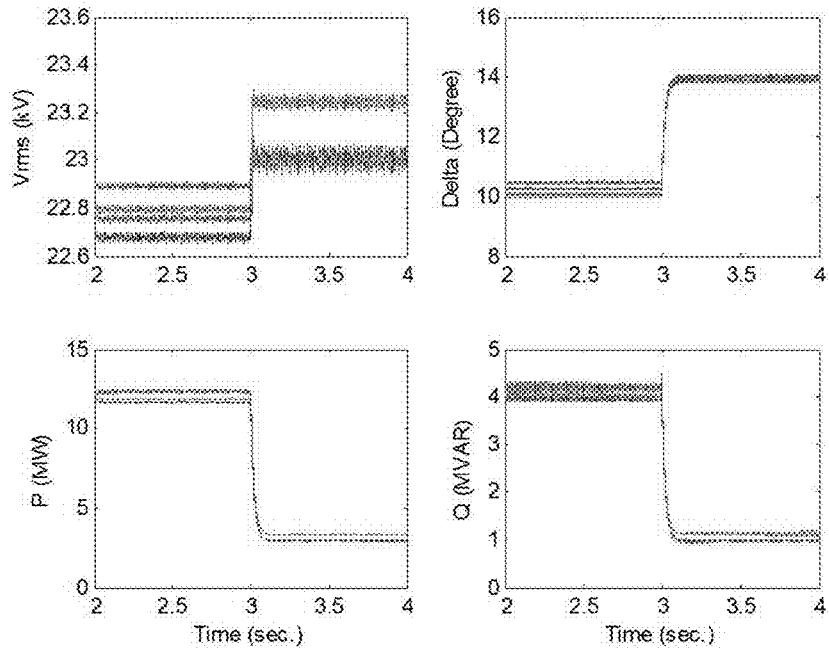
FIG. 11 is a graph illustrating a bus voltage, a phase, and active power and reactive power (75%) of three supply lines in a microgrid.

FIG. 10 and FIG. 11 illustrate changes in a power flow, a phase, and a voltage in distributed power supplies within three microgrids and three lines within a microgrid, respectively, in the case of 75% load shedding.

According to results of the simulations, a voltage in the distributed power supplies or power supply lines is as low as less than 0.02 pu before and after a change in load. However, in the case of 75% load shedding, a voltage of a bus from which a load is separated due to an effect of a susceptance within the microgrid is relatively greatly increased.

With respect to load share, all of the distributed power supplies equally share active and reactive powers regardless of a degree of a change in load, and a share rate in this case is the same as a share rate of three power supply lines in a single microgrid.

In order to change a share rate according to a change in load due to a capacity difference of each distributed power supply, a voltage input value is adjusted using a P-V droop curve in a manner similar to a conventional load share.

However, in the conventional load share, an amount of active power with respect to a frequency or a voltage is controlled, whereas in the converter controller according to the present invention, an amount of active power is measured and a suitable reference voltage is controlled. Thus, there are differences in configuration and application.

A detailed configuration of the above-described converter controller of the inverter-based stand-alone microgrid control system using a PMU according to the present invention is as follows.

The present invention is provided to operate a microgrid system in which a stand-alone microgrid or a converter is dominant. The converter controller is configured to control all the converters to maintain the same voltage, the same frequency, and the same phase.

In order to do so, according to the present invention, the converter controller enables all of the converters to operate the respective switches on the basis of a clear sinusoidal signal through GPS time synchronization.

A common coupling point (PCC) measurement-based control method may be affected by a change in a common coupling point caused by a disturbance or the like. However, in the control method using GPS time synchronization according to the present invention, the converter is operated by a clear sine wave and thus can produce an output in the form of a clear sine wave.

A configuration thereof is as illustrated in FIG. 12A. The converter controller configured to control a converter that determines a voltage and a phase of a point where a plurality of distributed power supply devices is interconnected includes: a time correction unit A configured to provide a time corrected on the basis of time information received from a GPS; a signal comparison/generation unit B configured to compare a sine wave generated according to a voltage magnitude and a phase reference signal with a harmonic carrier signal on the basis of the time provided by the time correction unit A, and generate a PWM signal; and a switch operation control unit C configured to apply the PWM signal from the signal comparison/generation unit B to the converter, and operate a switch.

Herein, the time correction unit A includes a GPS receiving unit 20 configured to receive time information once per second from the GPS and an internal clock 21, as a converter internal clock, configured to correct the time information once per second on the basis of a GPS signal and accurately provide a time of 1 second divided into microseconds.

Further, the signal comparison/generation unit B includes a function generation unit 22 configured to generate a sinusoidal signal on the basis of the time provided by the time correction unit A, and accurately generate a sine wave according to a voltage magnitude and a phase reference signal, a harmonic carrier signal generation unit 23 configured to generate a harmonic carrier signal in the range of 10 kHz to 20 kHz to be used by the converter, and a PWM signal generation unit 24 configured to compare the sine wave from the function generation unit 22 with the carrier signal from the harmonic carrier signal generation unit 23, and generate a PWM signal.

Further, the switch operation control unit C is configured to apply a PWM signal to a gate of an IGBT switch 26 in the converter and operate the switch.

With the above-described configuration, the time received from the GPS synchronizes all the converters, and the internal clock 21 compensates for a GPS time interval of 1 PPS.

The function generation unit 22 generates a clear sine wave on the basis of the given phase (or any constant value) and voltage, and the PWM signal generation unit 24 generates a pulse signal which can operate the IGBT switch 26 of the converter.

A method for controlling the inverter-based stand-alone microgrid control system using a PMU according to the present invention may be performed as follows.

FIG. 12B is a flowchart for controlling an inverter-based stand-alone microgrid control system using time synchronization according to the present invention.

Firstly, the GPS receiving unit 20 receives time information from the GPS (S1501).

Then, the internal clock 21 corrects the time information once per second on the basis of a GPS signal and accurately provides a time of 1 second divided into microseconds (S1502).

Then, the function generation unit 22 accurately generates a sine wave according to a voltage magnitude and a phase reference signal on the basis of the time provided by the internal clock 21 (S1503).

Then, the harmonic carrier signal generation unit 23 generates a harmonic carrier signal in the range of 10 kHz to 20 kHz to be used by the converter, and the PWM signal generation unit 24 compares the sine wave from the function generation unit 22 with the carrier signal from the harmonic carrier signal generation unit 23, and generates a PWM signal (S1504).

Further, a P-V droop curve control device offsets a capacity difference of each power supply by continuous update and determination from the central control center (S1505), and the switch operation control unit 25 applies the PWM signal from the PWM signal generation unit 24 to the gate of the IGBT switch 26 in the converter and operates the switch, thereby synchronizing all the converters (S1506).

Then, each converter-based power supply is operated by conducting a grid analysis based on synchronization data acquired by the PMU and thus providing an operation point (S1507).

Hereinafter, the inverter-based stand-alone microgrid control system using a PMU that enables each converter-based power supply to be accurately operated by conducting a grid analysis based on synchronization data acquired by the PMU and thus providing an accurate operation point and a method for controlling an operation thereof will be described in detail.

Figure 13:
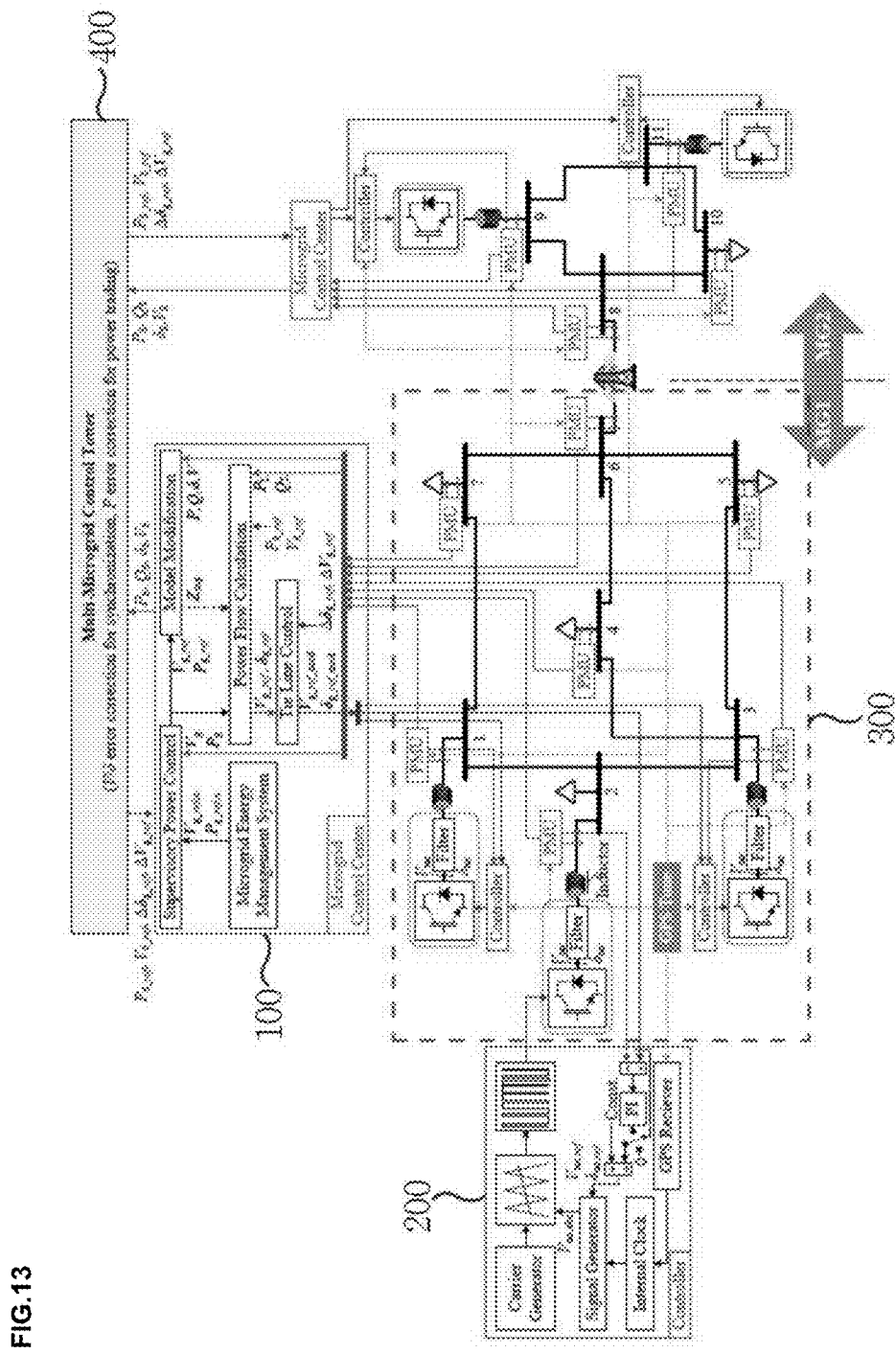
FIG. 13 is a configuration view of an inverter-based stand-alone microgrid control system using a PMU according to the present invention.

FIG. 13 is a configuration view of an inverter-based stand-alone microgrid control system using a PMU according to the present invention.

Figure 14:
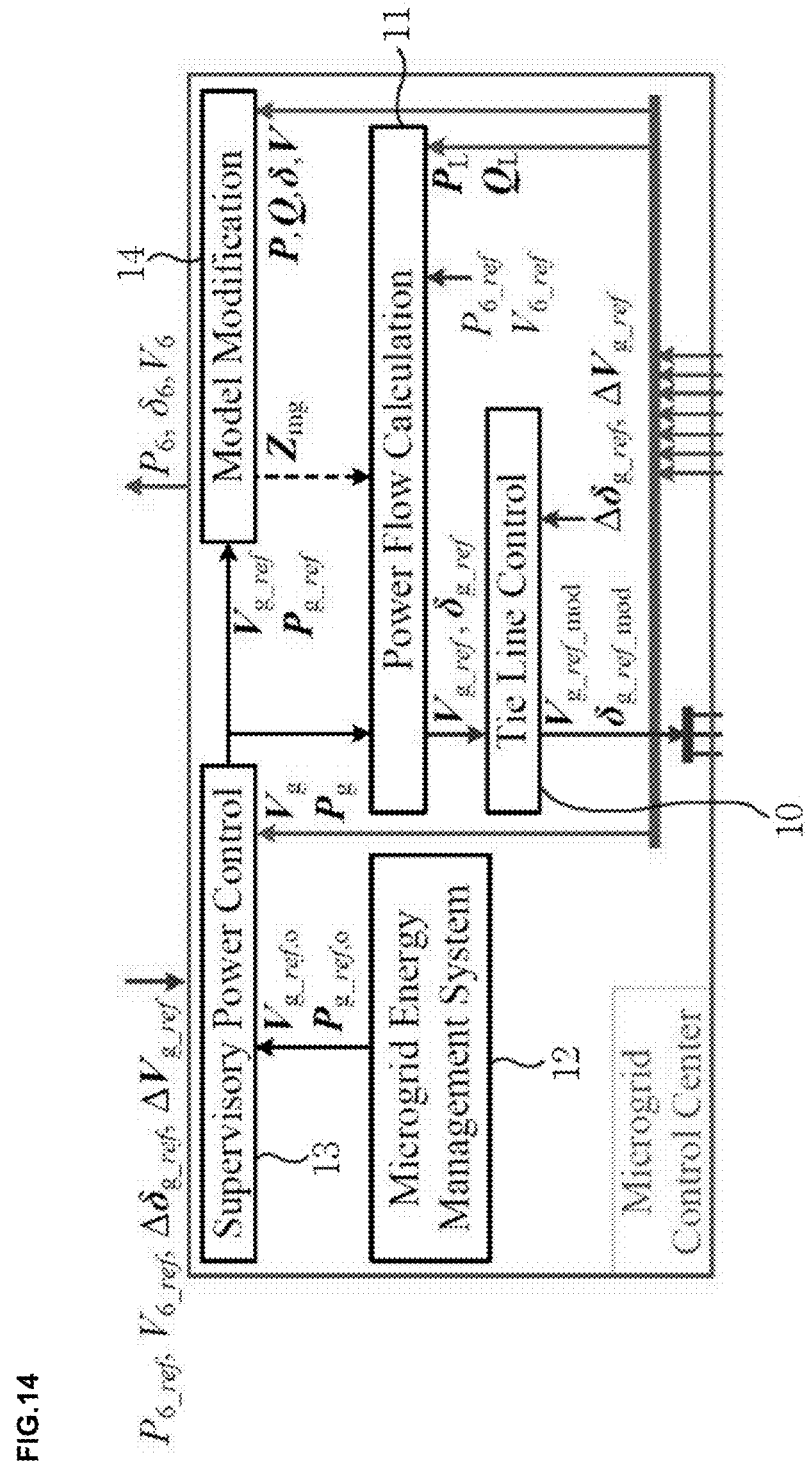
FIG. 14 is a configuration view of a microgrid control center according to the present invention.

Further, FIG. 14 is a configuration view of a microgrid control center according to the present invention.

A configuration of the entire microgrid system to which the microgrid control center according to the present invention is applied is as illustrated in FIG. 13, and includes: stand-alone microgrids 300 each including converters that determine a voltage and a phase of a point where a plurality of distributed power supply devices is interconnected; a converter controller 200 configured to correspond to each of the converters in order to control the converters included in the stand-alone microgrid and also configured to control a switch operation of each of the converters on the basis of a noiseless sinusoidal signal by maintaining the same voltage, the same frequency, and the same phase in all of the converters through GPS time synchronization; a microgrid control center 100 including a microgrid EMS (Microgrid Energy Management System) configured as a low-level control system to perform power-generation prediction and economic load dispatch for managing the microgrid and perform SCADA (Supervisory Control and Data Acquisition) for automatically supervising and controlling an operation state of a low-level system; and a multi-microgrid control tower 400 configured to control microgrid control centers respectively connected to microgrids.

In the microgrid system configured as described above, data acquired by a time synchronization-based measurement unit (PMU) installed in each microgrid are periodically transmitted to the microgrid control center 100, and the high-level multi-microgrid control tower 400 issues a command for multi-microgrid interconnection.

A detailed configuration of the microgrid control center 100 in the microgrid system configured as described above is as illustrated in FIG. 14.

The microgrid control center 100 includes: the microgrid EMS 12 configured to determine an output of a converter-based generator (CBG) and an input/output amount of an energy storage system (ESS) within the microgrid on the basis of current load, power-generation quantity, and SOC and predicted load and power-generation quantity pattern and provide initial operation reference values $V_{g\_ref,o}$ and $P_{g\_ref,o}$; a supervisory power control block 13 configured to compare current CBG and ESS operation values $V_g$ and $P_g$ transmitted from the measurement unit with the initial operation reference values $V_{g\_ref,o}$ and $P_{g\_ref,o}$ and provide modified operation reference values $V_{g\_ref}$ and $P_{g\_ref}$; a system model modification block 14 configured to compare actual system measurement values P, Q, δ, V obtained when the modified operation reference values $V_{g\_ref}$ and $P_{g\_ref}$ are transmitted and modify and complement a system model when there is a large error; a power flow calculation block 11 configured to perform a power flow calculation by reflecting the operation reference values $V_{g\_ref}$ and $P_{g\_ref}$ modified by the supervisory power control block 13 to a model to which currently measured loads $P_L$ and $Q_L$ are applied, and obtain a phase angle $\delta_{g\_ref}$ of the CBG to satisfy a given condition; and a tie line control means 10 configured to accurately control power transmission and interconnection between multi-microgrids.

Herein, the supervisory power control block 13 compares current CBG and ESS operation values $V_g$ and $P_g$ transmitted from the measurement unit with the initial operation reference values $V_{g\_ref,o}$ and $P_{g\_ref,o}$ as illustrated in the following Equation 1 in order to provide the operation reference values $V_{g\_ref}$ and $P_{g\_ref}$ modified by the supervisory power control block 13.

$$V_{g\_ref} = V_{g\_ref,o} - \alpha_V(V_g - V_{g\_ref,o}) - \beta_V \int (V_g - V_{g\_ref,o})$$

$$P_{g\_ref} = P_{g\_ref,o} - \alpha_P(P_g - P_{g\_ref,o}) - \beta_P \int (P_g - P_{g\_ref,o}) \quad \text{[Equation 1]}$$

Herein, $\alpha_x$ and $\beta_x$ are respectively reflected to sizes of the modified operation reference values.

Further, the supervisory power control block 13 continuously operates and reduces an error until the microgrid EMS 12 provides new initial operation reference values $V_{g\_ref,o}$ and $P_{g\_ref,o}$.

The modified operation reference values $V_{g\_ref}$ and $P_{g\_ref}$ are transmitted to the power flow calculation block 11 and the system model modification block 14 in each operation.

Further, the system model modification block 14 repeatedly compares a result of a power flow calculation using the modified operation reference values with the actual system measurement values and accurately reflects a microgrid impedance (Zmg) to a model for the power flow calculation block 11.

Further, the power flow calculation block 11 performs a power flow calculation by reflecting operation reference values $V_{6\_ref}$ and $P_{6\_ref}$ issued from the high-level multi-microgrid control tower in the case of a multi-microgrid including a number of interconnected microgrids, and a corresponding value enables accurate power transmission between multi-microgrids.

Further, the tie line control means 10 is configured to accurately control power transmission and interconnection between multi-microgrids. In a situation where multi-microgrids are continuously interconnected, the tie line control means 10 intactly uses the operation reference values $V_{g\_ref}$ and $\delta_{g\_ref}$ transmitted after the power flow calculation.

Further, in a situation where separated multi-microgrids are being interconnected, the tie line control means 10 controls a phase and a voltage in order to synchronize voltage magnitudes and phases of both interconnection buses by reflecting modified portions $\Delta V_{g\_ref}$ and $\Delta \delta_{g\_ref}$ of the operation reference values transmitted from the high-level multi-microgrid control tower as illustrated in the following Equation 2.

$$V_{g\_ref\_mod} = V_{g\_ref} + \Delta V_{g\_ref}$$

$$\delta_{g\_ref\_mod} = \delta_{g\_ref} + \Delta \delta_{g\_ref} \quad \text{[Equation 2]}$$

The present invention is provided to operate a microgrid system in which a stand-alone microgrid or a converter is dominant. The converter controller is configured to control all the converters to maintain the same voltage, the same frequency, and the same phase.

In order to do so, preferably, the converter controller according to the present invention may be configured as illustrated in FIG. 12A, and the converter controller enables all of the converters to operate the respective switches on the basis of a clear sinusoidal signal through GPS time synchronization.

A common coupling point (PCC) measurement-based control method may be affected by a change in a common coupling point caused by a disturbance or the like. However, in the control method using GPS time synchronization according to the present invention, the converter is operated by a clear sine wave and thus can produce an output in the form of a clear sine wave.

Figure 15:
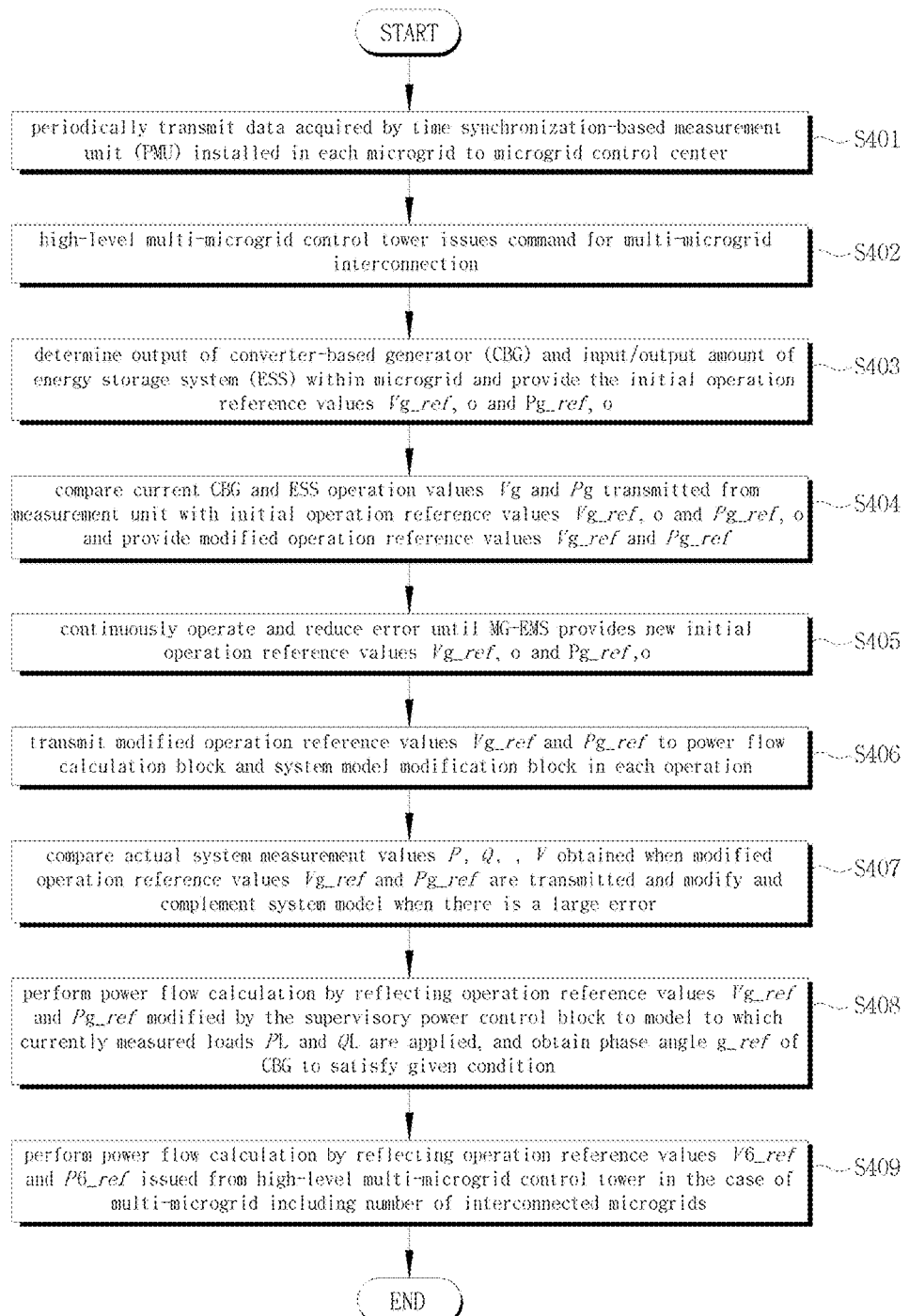
FIG. 15 is a flowchart illustrating a method for controlling an operation of an inverter-based stand-alone microgrid control system using a PMU according to the present invention.
Figure 16:
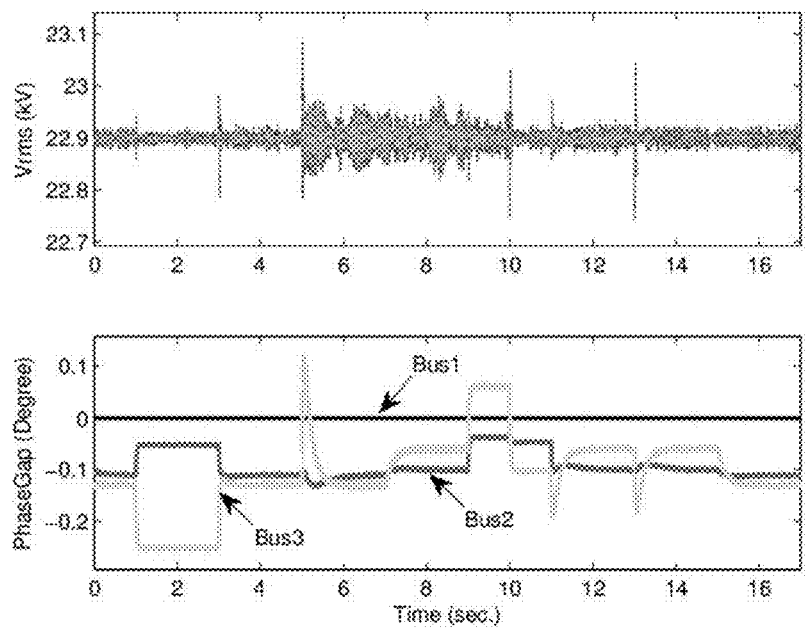
FIG. 16 and FIG. 17 are characteristic graphs when an operation of an inverter-based stand-alone microgrid control system using a PMU according to the present invention is controlled.
Figure 17:
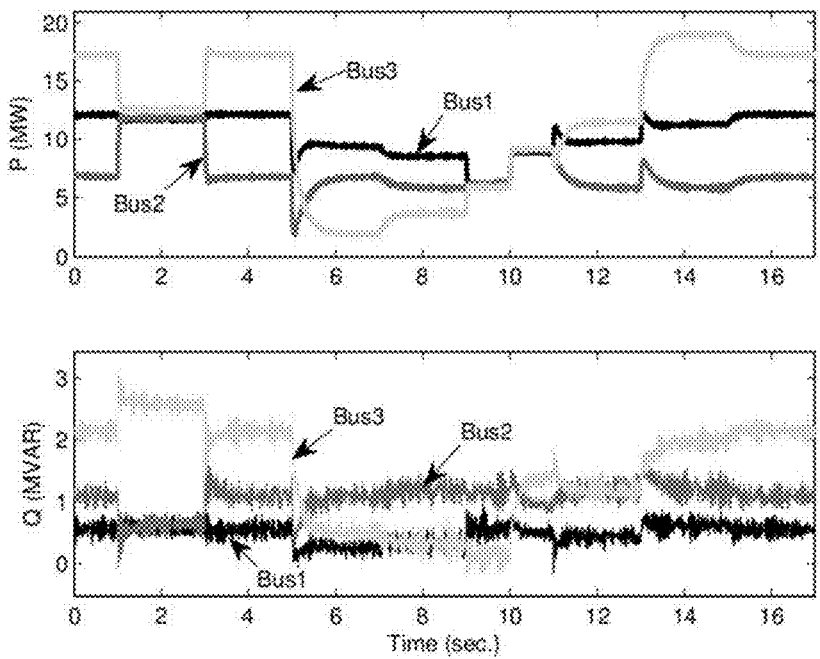

Further, FIG. 15 is a flowchart illustrating a method for controlling an operation of an inverter-based stand-alone microgrid control system using a PMU according to the present invention, and FIG. 16 and FIG. 17 are characteristic graphs when an operation of an inverter-based stand-alone microgrid control system using a PMU according to an exemplary embodiment of the present invention is controlled.

Firstly, data acquired by a time synchronization-based measurement unit (PMU) installed in each microgrid are periodically transmitted to the microgrid control center 100 (S401), and the high-level multi-microgrid control tower 400 issues a command for multi-microgrid interconnection (S402).

The microgrid EMS 12 determines an output of the converter-based generator (CBG) and an input/output amount of the energy storage system (ESS) within the microgrid on the basis of current load, power-generation quantity, and SOC and predicted load and power-generation quantity pattern and provides the initial operation reference values $V_{g\_ref,o}$ and $P_{g\_ref,o}$ (S403).

Then, the supervisory power control block 13 compares the current CBG and ESS operation values $V_g$ and $P_g$ transmitted from the measurement unit with the initial operation reference values $V_{g\_ref,o}$ and $P_{g\_ref,o}$ and provides the modified operation reference values $V_{g\_ref}$ and $P_{g\_ref}$ (S404).

The supervisory power control block 13 continuously operates and reduces an error until the microgrid EMS 12 provides the new initial operation reference values $V_{g\_ref,o}$ and $P_{g\_ref,o}$ (S405).

Further, the supervisory power control block 13 transmits the modified operation reference values $V_{g\_ref}$ and $P_{g\_ref}$ to the power flow calculation block 11 and the system model modification block 14 in each operation (S406).

Further, the system model modification block 14 compares the actual system measurement values P, Q, δ, V obtained when the modified operation reference values $V_{g\_ref}$ and $P_{g\_ref}$ are transmitted and modifies and complements a system model when there is a large error (S407).

The power flow calculation block 11 performs a power flow calculation by reflecting the operation reference values $V_{g\_ref}$ and $P_{g\_ref}$ modified by the supervisory power control block 13 to a model to which the currently measured loads $P_L$ and $Q_L$ are applied, and obtains a phase angle $\delta_{g\_ref}$ of the CBG to satisfy a given condition (S408).

Further, the power flow calculation block 11 performs a power flow calculation by reflecting the operation reference values $V_{6\_ref}$ and $P_{6\_ref}$ issued from the high-level multi-microgrid control tower in the case of a multi-microgrid including a number of interconnected microgrids, and a corresponding value enables accurate power transmission between multi-microgrids (S409).

Herein, the model modification process in the system model modification block 14 includes repeatedly comparing a result of a power flow calculation using the modified operation reference values with the actual system measurement values and accurately reflecting a microgrid impedance (Zmg) to a model for the power flow calculation block 11.

An exemplary embodiment of the method for controlling an operation of an inverter-based stand-alone microgrid control system using a PMU according to the present invention will be described below.

There are provided a microgrid interconnection technology and a converter controller configured to operate each switch on the basis of a clear sinusoidal signal by maintaining the same voltage, the same frequency, and the same phase in all of converters through GPS (Global Positioning System) time synchronization.

It is assumed that an MCC signal to be applied to operate the microgrid control center is updated at an interval of 3 seconds to 4 seconds and is placed on an operation state optimized for a 36 MW load-connected microgrid (an operation state for minimizing power loss through an optimum power flow calculation).

As illustrated in FIG. 16 and FIG. 17, when the microgrid control center (MCC) signal is lost at the time point of 1 s, a mode is converted into an operation mode without the MCC and a phase is shifted.

In this case, an output of each CBG focuses on the maintenance of the microgrid instead of an optimum operation of the microgrid, and the output of each CBG is maintained at the same level according to a microgrid topology.

At the time point of 3 s, the MCC signal is updated and recovered. The mode is converted into an MCC-applied operation mode and the phase returns to its original position. An output of the CBG returns to a grid optimum operation state.

It can be seen that at the time point of 5 s, 18 MW load shedding occurs (corresponding to 50% of a whole load), and each CBG is in a state before receiving an optimum reference value from the MCC but appropriately adjusts an output so as to immediately respond to the change.

It can be seen that due to the immediate response, a voltage change is maintained to 1% or less and there is little change considering a severe condition of 50% load shedding.

At the time point of 7 s, the MCC signal is updated and an optimum phase value is provided, and an output of the CBG is partially changed to be in a state optimized for the microgrid.

At the time point of 9 s, if the MCC signal is lost again, all of the CBGs produce the same output and the mode is converted into an operation mode without the MCC in the same manner as illustrated at the time point of 1 s.

At the time point of 10 s, in a state where the MCC is absent, a load increases by 9 MW (corresponding to 50% before the change) and all of the CBGs are equally increased in output and immediately respond to a change, thereby maintaining the microgrid.

At the time point of 11 s, the MCC signal is updated and recovered. The CBG operates in the MCC-applied operation mode at an optimum phase.

It can be seen that at the time point of 13 s, a load increases again by 9 MW and even before the MCC signal is updated, the CBG operates at an approximate optimum phase value.

At the time point of 15 s, the MCC signal is updated and an optimum phase value is provided, resulting in an optimum operation. The value is equal to an initial value.

As illustrated in FIG. 16 and FIG. 17, it can be seen that although the MCC signal corresponds to 4 seconds of a current large-scale power grid level and is too slow to control the converter in real time, it is possible to stably operate a grid by including a microgrid interconnection technology and a converter controller configured to operate each switch on the basis of a clear sinusoidal signal by maintaining the same voltage, the same frequency, and the same phase in all of converters through GPS (Global Positioning System) time synchronization.

Further, it can be seen that it is possible to immediately manage a loss of the MCC signal or a sharp change in a grid state prior to an update of the MCC signal and there is little change in a microgrid voltage due to an immediate response of the CBG.

Further, an inverter-based inertia-free stand-alone microgrid system using a PMU according to the present invention and a method for controlling an operation thereof including PMU-based acquisition of phase synchronization data and control of a phase synchronization converter based on GPS time synchronization will be described below.

Figure 18:
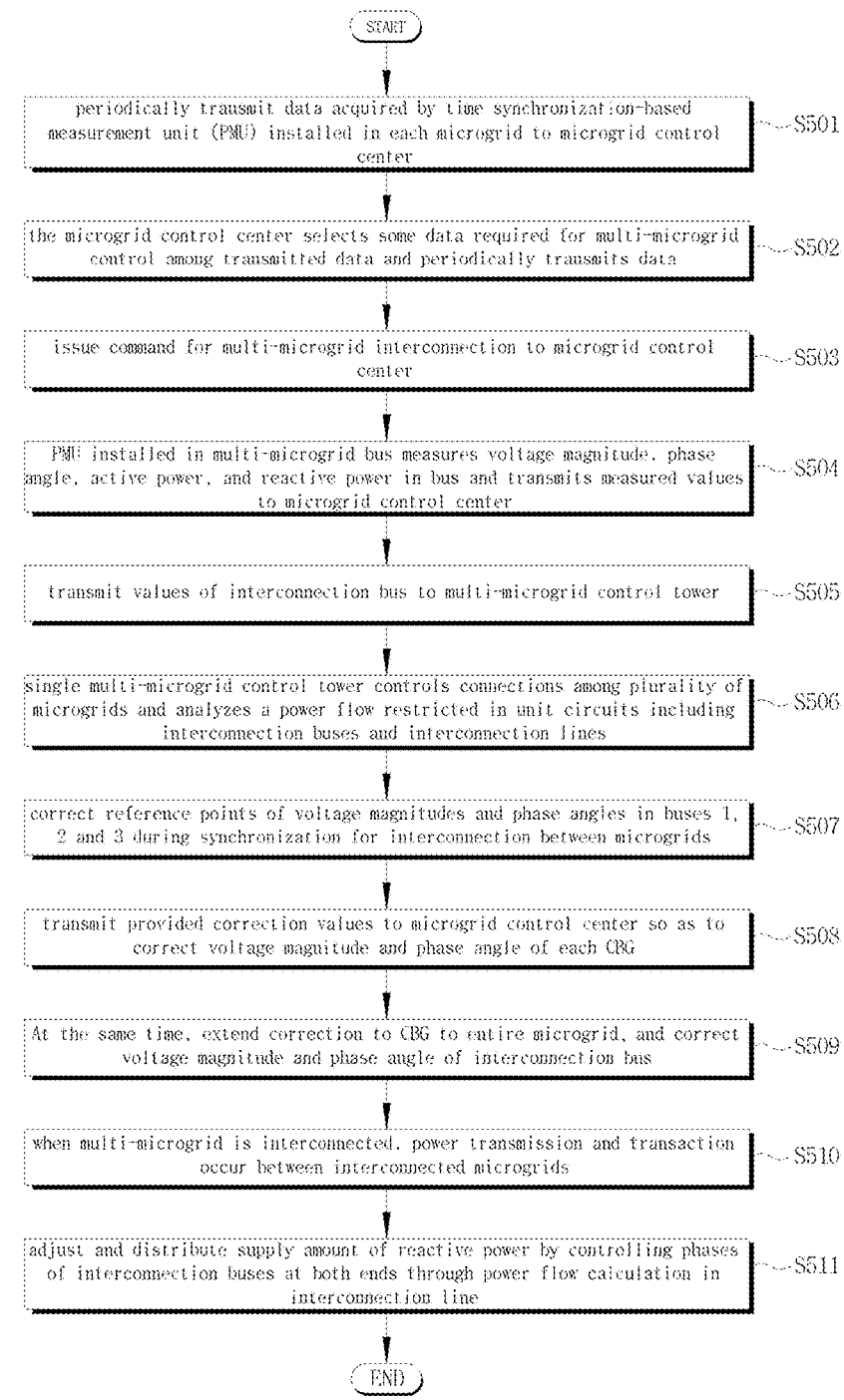
FIG. 18 is a flowchart illustrating a method for controlling an operation of an inverter-based inertia-free stand-alone microgrid system using a PMU according to the present invention.
Figure 19:
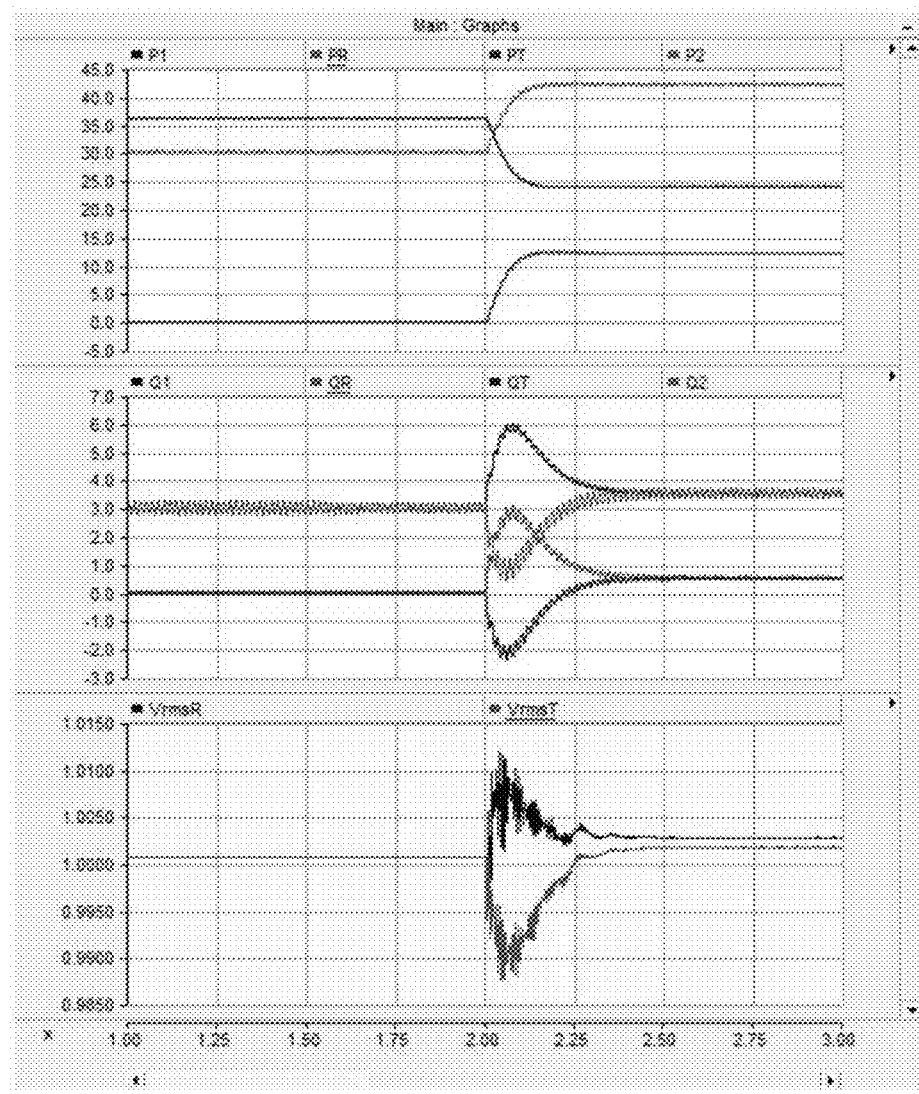
FIG. 19 is a graph illustrating a process for power transmission between microgrids according to the present invention.

FIG. 18 is a flowchart illustrating a method for controlling an operation of an inverter-based inertia-free stand-alone microgrid system using a PMU according to the present invention, and FIG. 19 is a graph illustrating a process for power transmission between microgrids according to the present invention.

The present invention makes it possible to effectively control an operation of each microgrid and power management (transaction) between microgrids by using a multi-microgrid technology including PMU-based acquisition of phase synchronization data and control of a phase synchronization converter based on GPS time synchronization.

The inverter-based inertia-free stand-alone microgrid system using a PMU according to the present invention for an operation of each microgrid and power management (transaction) between microgrids will be described with reference to FIG. 13 and FIG. 14.

The inverter-based inertia-free stand-alone microgrid system using a PMU includes: the stand-alone microgrids (MG1) (MG2) 300 each including converters that determine a voltage and a phase of a point where a plurality of distributed power supply devices is interconnected; the converter controller 200 configured to correspond to each of the converters in order to control the converters included in the stand-alone microgrid and also configured to control a switch operation of each of the converters on the basis of a noiseless sinusoidal signal by maintaining the same voltage, the same frequency, and the same phase in all of the converters through GPS time synchronization; the microgrid control center 100 including the microgrid EMS (Microgrid Energy Management System) including a high-level control system configured to perform power-generation prediction and economic load dispatch for managing the microgrid and a low-level control system configured to perform SCADA (Supervisory Control and Data Acquisition) for automatically supervising and controlling an operation state of a low-level system; the multi-microgrid control tower 400 configured to control microgrid control centers respectively connected to microgrids, perform a control on the basis of voltage magnitudes and phases at both buses of a tie line, synchronize the both buses when interconnecting separated microgrids, and issue a command to a microgrid control center of each microgrid so as to have a phase and a voltage for power transmission between multi-microgrids after interconnection.

In the microgrid system configured as described above, data acquired by a time synchronization-based measurement unit (PMU) installed in each microgrid are periodically transmitted to the microgrid control center 100, and the high-level multi-microgrid control tower 400 issues a command for multi-microgrid interconnection.

The method for controlling the inverter-based inertia-free stand-alone microgrid system using a PMU according to the present invention is as follows.

As illustrated in FIG. 18, firstly, data acquired by a time synchronization-based measurement unit (PMU) installed in each microgrid are periodically transmitted to the microgrid control center 100 (S501), and the microgrid control center 100 selects some data required for multi-microgrid control among the transmitted data and periodically transmits the data to the high-level multi-microgrid control tower 400 (S502).

The high-level multi-microgrid control tower 400 issues a command for multi-microgrid interconnection to the microgrid control center 100 (S503).

Then, PMU installed in a multi-microgrid bus measures a voltage magnitude, a phase angle, active power, and reactive power in the bus and transmits the measured values to the microgrid control center 100 (S504).

Herein, values of an interconnection bus are transmitted to the multi-microgrid control tower 400 (S505).

Further, the single multi-microgrid control tower 400 controls connections among a plurality of microgrids and analyzes a power flow restricted in unit circuits including interconnection buses and interconnection lines in order to solve a sharp increase in system resource occurring when analyzing all of the microgrids (S506).

For example, as for a unit circuit, the multi-microgrid control tower 400 corrects reference points of voltage magnitudes and phase angles in buses 1, 2 and 3 as illustrated in Equation 3 during synchronization for interconnection between microgrids (S507).

The provided correction values are transmitted to the microgrid control center 100 so as to correct a voltage magnitude and a phase angle of each CBG (S508).

$$\Delta V_{g\_ref} = (V_8 - V_6)$$

$$\Delta \delta_{g\_ref} = (\delta_8 - \delta_6)$$ [Equation 3]

At the same time, the correction to the CBG is extended to the entire microgrid, and a voltage magnitude and a phase angle of the interconnection bus are also corrected (S509).

That is, the concurrent correction to the CBG enables the single microgrid to operate as a single huge converter on the basis of the interconnection bus.

Further, when the multi-microgrid is interconnected, power transmission and transaction can occur between interconnected microgrids. Further, active power is accurately transmitted on the basis of an analysis of a power flow in an interconnection line, and a supply amount of power in the interconnection line is calculated according to Equation 4.

$$S_6 = P_6 + jQ_6 = V_6^2 Y_{68} e^{-j\alpha_{68}} - V_6 V_8 Y_{68} e^{j(\delta_6 - \delta_8 - \alpha_{68})}$$

$$S_8 = P_8 + jQ_8 = V_6^2 Y_{68} e^{-j\alpha_{68}} - V_8 V_6 Y_{68} e^{j(\delta_6 - \delta_8 - \alpha_{68})}$$ [Equation 4]

That is, it is necessary to supply reactive power due to the transmission of the active power. A supply amount of the reactive power can be adjusted and distributed by controlling phases of interconnection buses at both ends through a calculation of the power flow in the interconnection line.

An exemplary embodiment of the method for controlling an inverter-based inertia-free stand-alone microgrid system using a PMU according to the present invention will be described below.

The method includes a microgrid interconnection technology and a converter controller configured to operate each switch on the basis of a clear sinusoidal signal by maintaining the same voltage, the same frequency, and the same phase in all of converters through GPS (Global Positioning System) time synchronization.

It is assumed that a 36 MW microgrid and a 30 MW microgrid are interconnected.

As illustrated in FIG. 19, at the time point of 2 s, a load is supplied to each microgrid without mutual power transmission in advance. Herein, P1 denotes a total power-generation quantity of the 36 MW microgrid, P2 denotes a total power-generation quantity of the 30 MW microgrid, and PT denotes an amount of power transmitted from the 30 MW microgrid to the 30 MW microgrid. At this time, both interconnection buses have the same voltage magnitude and the same phase angle.

2 second later, the P2 increases to 42 MW, the P1 decreases to 24 MW, and the PT increases to 12 MW, resulting in transmission of power deficit from the 30 MW microgrid to the 36 MW microgrid.

The above-described inverter-based stand-alone microgrid control system using a PMU according to the present invention and method for controlling an operation thereof make it possible to provide a microgrid interconnection technology and a converter controller configured to operate each switch on the basis of a clear sinusoidal signal by maintaining the same voltage, the same frequency, and the same phase in all of converters through GPS time synchronization.

Further, the present invention enables each converter-based power supply to be accurately operated by conducting a grid analysis based on synchronization data acquired by a PMU (Phase Measurement Unit) and thus providing an accurate operation point, and requires a very few calculation resources for a grid analysis and has a strong grid operational capability even in an unstable communication environment such as a signal delay or disconnection from a central control center.

Furthermore, the present invention makes it possible to effectively control an operation of each microgrid and power management (transaction) between microgrids by using a multi-microgrid technology including PMU-based acquisition of phase synchronization data and control of a phase synchronization converter based on GPS time synchronization PMU.

As described above, it can be understood that the present invention is implemented as being modified and changed within the scope departing from the spirit and the scope of the present invention.

Accordingly, the above-described exemplary embodiments should be considered in descriptive sense only and not for purposes of limitation. Also, the technical scope of the present invention is defined not by the detailed description of the invention but by the appended claims, and all differences within the scope will be construed as being comprised in the present invention.

EXPLANATION OF CODES

100: Microgrid control center
200: Converter controller
300: Stand-alone microgrid
400: Multi-microgrid control tower

What is claimed is:

1. An inverter-based stand-alone microgrid control system using a time synchronization-based measurement unit, comprising:
   a stand-alone microgrid including a converter that determines a voltage and a phase of a point where a plurality of distributed power supply devices is interconnected;
   a converter controller configured to control the converter;
   a time correction unit configured to provide a time corrected on the basis of time information received from a Global Positioning System (GPS);
   a signal comparison/generation unit configured to compare a sine wave generated according to a voltage magnitude and a phase reference signal with a harmonic carrier signal on the basis of the time provided by the time correction unit, and generate a Pulse Width Modulation (PWM) signal; and
   a switch operation control unit configured to apply the PWM signal from the signal comparison/generation unit to the converter, and operate a switch.

2. The inverter-based stand-alone microgrid control system using the time synchronization-based measurement unit of claim 1, wherein the time correction unit includes:
   a GPS receiving unit configured to receive time information once per second from the GPS; and
   an internal clock, as a converter internal clock, configured to correct the time information once per second on the basis of a GPS signal and accurately provide a time of 1 second divided into microseconds.

3. The inverter-based stand-alone microgrid control system using the time synchronization-based measurement unit of claim 1, wherein the signal comparison/generation unit includes:
   a function generation unit configured to generate a sinusoidal signal on the basis of the time provided by the time correction unit, and generate the sine wave according to a voltage magnitude and a phase reference signal;
   a harmonic carrier signal generation unit configured to generate the harmonic carrier signal in the range of 10 kHz to 20 kHz to be used by the converter; and
   a PWM signal generation unit configured to compare the sine wave from the function generation unit with the harmonic carrier signal from the harmonic carrier signal generation unit, and generate the PWM signal.

4. An inverter-based stand-alone microgrid control system using a time synchronization-based measurement unit, comprising:
   a stand-alone microgrid including converters that determine a voltage and a phase of a point where a plurality of distributed power supply devices is interconnected;
   a converter controller configured to correspond to each of the converters in order to control the converters included in the stand-alone microgrid and also configured to control a switch operation of each of the converters on the basis of a noiseless sinusoidal signal; and
   a microgrid control center including a microgrid Energy Management System (EMS) configured to provide initial operation reference values, and configured to perform power-generation prediction and economic load dispatch for managing the stand-alone microgrid and perform Supervisory Control and Data Acquisition (SCADA) for automatically supervising and controlling an operation state of a low-level system.

5. The inverter-based stand-alone microgrid control system using the time synchronization-based measurement unit of claim 4, wherein the time synchronization-based measurement unit is installed in the microgrid and data acquired by the time synchronization-based measurement unit are periodically transmitted to the microgrid control center, and a high-level multi-microgrid control tower issues a command for multi-microgrid interconnection.

6. The inverter-based stand-alone microgrid control system using the time synchronization-based measurement unit of claim 4, wherein the microgrid EMS determines an output of a converter-based generator (CBG) and an input/output amount of an energy storage system (ESS) within the microgrid on the basis of current load, power-generation quantity, and State Of Charge (SOC) and predicted load and power-generation quantity pattern and provides the initial operation reference values.

7. The inverter-based stand-alone microgrid control system using the time synchronization-based measurement unit of claim 4, wherein the microgrid control center includes:
   a supervisory power control block configured to compare current a Converter-Based Generator (CBG) and an Energy Storage System (ESS) operation values transmitted from the time synchronization-based measurement unit with the initial operation reference values and provide modified operation reference value.

8. The inverter-based stand-alone microgrid control system using the time synchronization-based measurement unit of claim 7, wherein the supervisory power control block continuously operates and reduces an error until the microgrid EMS provides new initial operation reference values, and transmits modified operation reference values to a power flow calculation block and a system model modification block in each operation.

9. The inverter-based stand-alone microgrid control system using the time synchronization-based measurement unit of claim 4, wherein the microgrid control center includes:
   a system model modification block configured to compare actual system measurement values obtained when modified operation reference values are transmitted and modify and complement a system model when an error is greater than a reference value.

10. The inverter-based stand-alone microgrid control system using the time synchronization-based measurement unit of claim 9, wherein the system model modification block repeatedly compares a result of a power flow calculation using the modified operation reference values with the actual system measurement values and reflects a microgrid impedance ($Zmg$) to a model for a power flow calculation block.

11. The inverter-based stand-alone microgrid control system using the time synchronization-based measurement unit of claim 4, wherein the microgrid control center includes:
   a power flow calculation block configured to perform a power flow calculation by reflecting operation reference values modified by a supervisory power control block to a model to which currently measured loads are applied, and obtain a phase angle of a Converter-Based Generator (CBG) to satisfy a given condition.

12. The inverter-based stand-alone microgrid control system using the time synchronization-based measurement unit of claim 11, wherein the power flow calculation block performs a power flow calculation by reflecting operation reference values issued from a high-level multi-microgrid control tower in the case of a multi-microgrid including a number of interconnected microgrids, and
a corresponding value is used for power transmission between multi-microgrids.

13. The inverter-based stand-alone microgrid control system using the time synchronization-based measurement unit of claim 4, wherein the microgrid control center includes:
a tie line control means configured to control power transmission and interconnection between multi-microgrids, and
in a situation where multi-microgrids are continuously interconnected, the tie line control means intactly uses operation reference values transmitted after a power flow calculation, and
in a situation where separated multi-microgrids are being interconnected, the tie line control means synchronizes voltage magnitudes and phases of both interconnection buses by reflecting modified portions of the operation reference values transmitted from a high-level multi-microgrid control tower.

14. An inverter-based stand-alone microgrid control system using a time synchronization-based measurement unit, comprising:
stand-alone microgrids each including converters that determine a voltage and a phase of a point where a plurality of distributed power supply devices is interconnected;
a converter controller configured to correspond to each of the converters in order to control the converters included in the stand-alone microgrid and also configured to control a switch operation of each of the converters;
a microgrid control center configured to perform power-generation prediction and economic load dispatch for managing the microgrid and perform Supervisory Control and Data Acquisition (SCADA) for automatically supervising and controlling an operation state of a low-level system; and
a multi-microgrid control tower configured to control microgrid control centers respectively connected to microgrids, synchronize both buses when interconnecting separated microgrids, and issue a command to a microgrid control center of each microgrid so as to have a phase and a voltage for power transmission between multi-microgrids after interconnection.

15. The inverter-based stand-alone microgrid control system using the time synchronization-based measurement unit of claim 14, wherein the time synchronization-based measurement unit is installed in the microgrid and data acquired by the time synchronization-based measurement unit are periodically transmitted to the microgrid control center,
the microgrid control center periodically transmits data for multi-microgrid control among the transmitted data to the multi-microgrid control tower, and
the multi-microgrid control tower issues a command for multi-microgrid interconnection to the microgrid control center.

16. The inverter-based stand-alone microgrid control system using the time synchronization-based measurement unit of claim 14, wherein the time synchronization-based measurement unit installed in a multi-microgrid bus measures a voltage magnitude, a phase angle, active power, and reactive power in the bus and transmits the measured values to the microgrid control center, and
the microgrid control center transmits values of an interconnection bus to the multi-microgrid control tower.

17. The inverter-based stand-alone microgrid control system using the time synchronization-based measurement unit of claim 14, wherein the multi-microgrid control tower corrects reference points of voltage magnitudes and phase angles of unit circuits each including an interconnection bus and an interconnection line during synchronization for interconnection between microgrids, and
the provided correction values are transmitted to the microgrid control center to correct a voltage magnitude and a phase angle of each Converter-Based Generator (CBG).

18. The inverter-based stand-alone microgrid control system using the time synchronization-based measurement unit of claim 17, wherein the correction to the CBG is extended to the entire microgrid, and a voltage magnitude and a phase angle of the interconnection bus are also corrected, so that a single microgrid operates as a single converter on the basis of the interconnection bus.

19. The inverter-based stand-alone microgrid control system using the time synchronization-based measurement unit of claim 14, wherein when the multi-microgrids are interconnected, the multi-microgrid control tower controls power transmission and transaction between interconnected microgrids and transmits active power on the basis of an analysis of a power flow in an interconnection line, and
a supply amount of reactive power needed due to the transmission of the active power is adjusted and distributed by controlling phases of interconnection buses at both ends through a calculation of the power flow in the interconnection line.

20. The inverter-based stand-alone microgrid control system using the time synchronization-based measurement unit of claim 1, wherein the converter controller controls all the converters included in the stand-alone microgrid to maintain the same voltage, the same frequency, and the same phase through GPS time synchronization.

* * * * *